US012373335B2

(12) United States Patent
Bernstein et al.

(10) Patent No.: US 12,373,335 B2
(45) Date of Patent: Jul. 29, 2025

(54) MEMORY THIN PROVISIONING USING MEMORY POOLS

(71) Applicant: Intel Corporation, Santa Clara, CA (US)

(72) Inventors: Debra Bernstein, Sudbury, MA (US); Hugh Wilkinson, Newton, MA (US); Douglas Carrigan, Chandler, AZ (US); Bassam N. Coury, Portland, OR (US); Matthew J. Adiletta, Bolton, MA (US); Durgesh Srivastava, Cupertino, CA (US); Lidia Warnes, Roseville, CA (US); William Wheeler, Southborough, MA (US); Michael F. Fallon, Wellesley, MA (US)

(73) Assignee: Intel Corporation, Santa Clara, CA (US)

( * ) Notice: Subject to any disclaimer, the term of this patent is extended or adjusted under 35 U.S.C. 154(b) by 813 days.

(21) Appl. No.: 16/727,595

(22) Filed: Dec. 26, 2019

(65) Prior Publication Data

US 2021/0200667 A1 Jul. 1, 2021

(51) Int. Cl.
*G06F 12/02* (2006.01)
*G06F 3/06* (2006.01)

(52) U.S. Cl.
CPC .......... *G06F 12/023* (2013.01); *G06F 3/0604* (2013.01); *G06F 3/0658* (2013.01); *G06F 3/0659* (2013.01); *G06F 3/0685* (2013.01)

(58) Field of Classification Search
None
See application file for complete search history.

(56) References Cited

U.S. PATENT DOCUMENTS 6,035,377 A * 3/2000 James ............... G06F 12/122
711/E12.071
9,135,176 B1 * 9/2015 Derbeko ............. G06F 12/0871
(Continued)

OTHER PUBLICATIONS

Amit, Nadav, "Optimizing the TLB Shootdown Algorithm with Page Access Tracking", Usenix, The Advanced Computing Systems Association, This paper is included in the Proceedings of the 2017 USENIX Annual Technical Conference (USENIX ATC '17). Jul. 12-14, 2017 . Santa Clara, CA, USA, 15 pages.

(Continued)

*Primary Examiner* — Arpan P. Savla
*Assistant Examiner* — Edmund H Kwong
(74) *Attorney, Agent, or Firm* — Compass IP Law PC

(57) ABSTRACT

Examples described herein relate to memory thin provisioning in a memory pool of one or more dual in-line memory modules or memory devices. At any instance, any central processing unit (CPU) can request and receive a full virtual allocation of memory in an amount that exceeds the physical memory attached to the CPU (near memory). A remote pool of additional memory can be dynamically utilized to fill the gap between allocated memory and near memory. This remote pool is shared between multiple CPUs, with dynamic assignment and address re-mapping provided for the remote pool. To improve performance, the near memory can be operated as a cache of the pool memory. Inclusive or exclusive content storage configurations can be applied. An inclusive cache configuration can include an entry in a near memory cache also being stored in a memory pool whereas an exclusive cache configuration can provide an entry in either a near memory cache or in a memory pool but not both. Near memory cache management includes current data location tracking, access counting and other caching heuristics, eviction of data from near memory cache to pool (Continued)

memory and movement of data from pool memory to memory cache.

17 Claims, 28 Drawing Sheets

(56) References Cited

U.S. PATENT DOCUMENTS

| | | | |
|---|---|---|---|
| 9,569,459 B1 * | 2/2017 | Strauss | G06F 16/182 |
| 10,056,155 B2 | 8/2018 | Pappu et al. | |
| 10,228,861 B2 | 3/2019 | Ray et al. | |
| 10,469,252 B2 | 11/2019 | Schmisseur et al. | |
| 10,649,813 B2 | 5/2020 | Schmisseur et al. | |
| 2017/0147214 A1 | 5/2017 | Ray et al. | |
| 2017/0168942 A1 * | 6/2017 | Bernat | G06F 12/0815 |
| 2017/0185316 A1 * | 6/2017 | Nieuwejaar | H04L 67/1097 |
| 2017/0357595 A1 | 12/2017 | Northup et al. | |
| 2018/0285290 A1 * | 10/2018 | Luan | G06F 13/4022 |
| 2018/0336142 A1 * | 11/2018 | Pellegrini | G06F 12/1009 |
| 2019/0042445 A1 | 2/2019 | Swaminathan et al. | |
| 2019/0065112 A1 | 2/2019 | Schmisseur et al. | |
| 2020/0042454 A1 * | 2/2020 | Li | G06F 11/2058 |
| 2020/0371692 A1 * | 11/2020 | Van Doorn | G06F 3/0631 |
| 2020/0379811 A1 * | 12/2020 | Monteiro Soares | G06F 12/0646 |

OTHER PUBLICATIONS

Harris, Sarah L., et al., "Direct Mapped Cache—Memory Systems", ScienceDirect, in Digital Design and Computer Architecture, ARM Edition, 2016, pp. 486-529, downloaded from https://www.sciencedirect.com/topics/computer-science/direct-mapped-cache, 29 pages.

Lim, Kevin, et al., "Disaggregated Memory for Expansion and Sharing in Blade Servers", ISCA'09, Jun. 20-24, 2009, Austin, Texas, USA., Copyright 2009 ACM, 12 pages.

Microsoft Docs, "Thin Provisioning", Thin Provisioning—Windows drivers | Microsoft Docs, Oct. 3, 2019, downloaded from https://docs.microsoft.com/en-us/windows-hardware/drivers/storage/thin, 6 pages.

Keisier, Patrick, "VMware vSphere Storage Performance—Thick vs Thin Provisioning", https://www.patrickkeisler.com/2013/06/vmware-vsphere-storage-performance.html, Jun. 2013, 5 pages.

* cited by examiner

| Address | Location | Written | Valid | Accesses |
|---------|----------|---------|-------|----------|
| A | 00 | Yes | Yes | 20 |
| B | 10 | No | No | 3 |

| ZZ | 01 | Yes | Yes | 50 |

FIG. 17

MEMORY THIN PROVISIONING USING MEMORY POOLS

Computing platforms or systems such as those configured as a server, personal computer, or other computing device may access dual in-line memory modules (DIMMs). DIMMs may include various types of memory including volatile or non-volatile types of memory. As memory technologies have advanced to include memory cells with higher and higher densities, memory capacities for DIMMs have also substantially increased. Also, advances in data rates for accessing data to be written to or read from memory included in a DIMM enable large amounts of data to flow between a requestor needing access and memory devices included in the DIMM. Numerous memory devices can be coupled to a bus, fabric, or network so that a pool of memory is shared across multiple compute nodes. A host device can use a network interface controller (NIC) or host fabric interface (HFI) to access one or more local or remote storage or memory pools using fabric or network or interconnect.

BRIEF DESCRIPTION OF THE DRAWINGS

FIG. 17 depicts a metadata entry.

DETAILED DESCRIPTION

Figure 1:
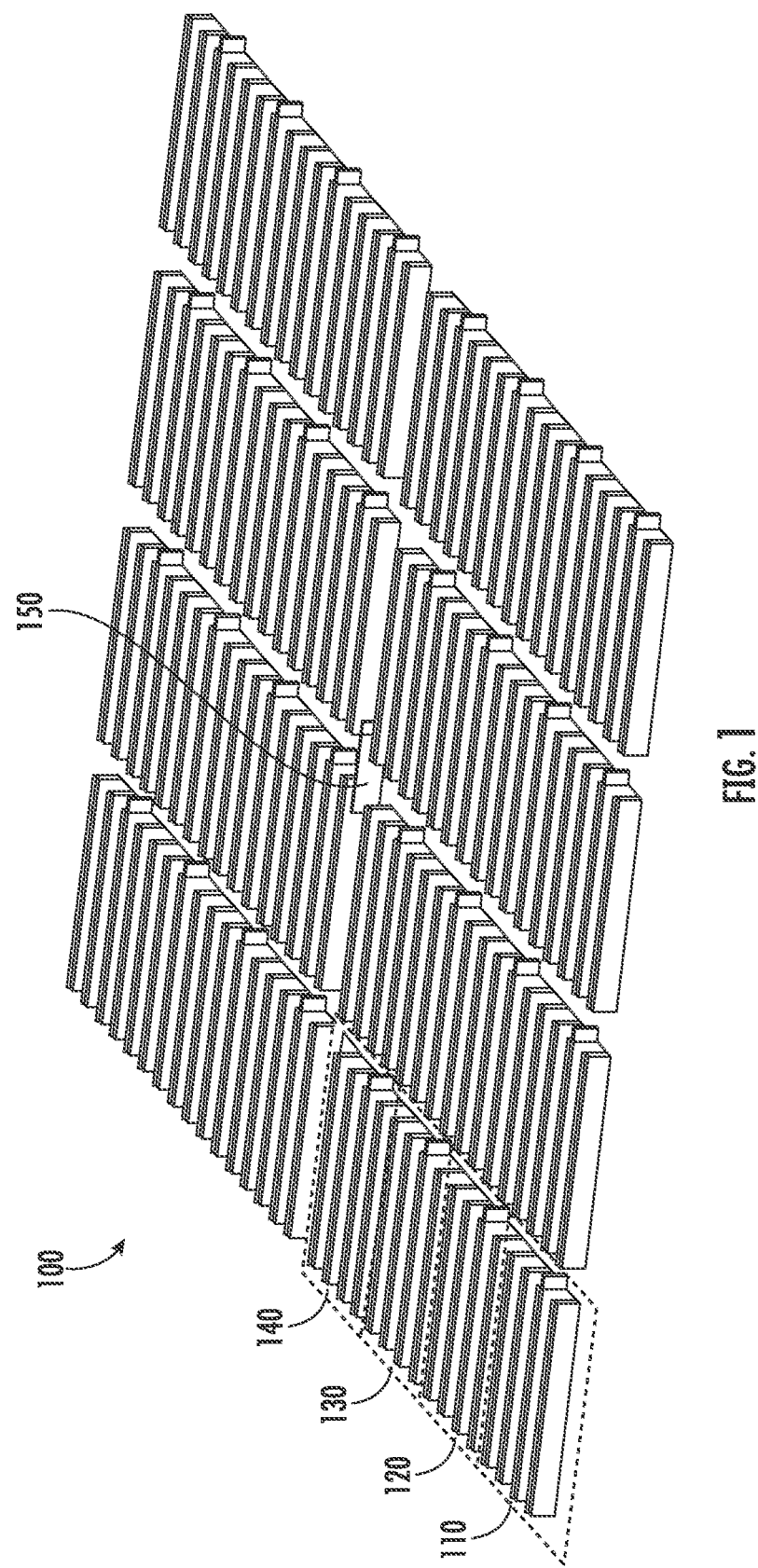
FIG. 1 is a simplified diagram of at least one embodiment of a data center for executing workloads with disaggregated resources.

In some cases, software workloads (or hardware-based workloads) use significantly less memory than allocated, yet compute nodes are built to house the allocated amount of memory for the workloads. Workloads often do not use all of the allocated memory at the same time in that some memory addresses store content that is frequency used ("hot data"), and some memory address store content that are infrequently used ("cold data"). It is a challenging problem to schedule workloads across a data center. An amount of requested compute and amount of requested memory are key initial parameters in the scheduling decision. An outcome of scheduling often allows idle memory and/or compute resources.

Memory thin provisioning is a manner capable of saving storage or memory resources. As the cost of memory is expensive, saving memory can be beneficial. Under memory thin provisioning, physical storage resources initially allocated to application programs are less than virtual storage resources allocated to application programs or other software. Under provisioning or thin provisioning can be a memory allocation allocated to a processor (e.g., an executed a virtual execution environment or executed application) being greater than an actual amount of physical addressable memory allocated among the memory and/or the memory pool to the processor. When the physical storage resources allocated to the application programs cannot meet needs of application programs, physical storage resources are gradually added until the physical storage resources reach the virtual storage resources. An application program only needs to manage the declared virtual storage resources. Accordingly, a smaller physical storage resource may be used to support a larger virtual storage resource, thereby improving use efficiency of the physical storage resources.

Memory thin provisioning allows less memory on a compute node and building a memory pool that is shared by multiple compute nodes. The shared memory can be dynamically allocated/deallocated to compute nodes with allocation set at page or cache line granularity. In aggregate, memory allocated on all compute nodes and memory in shared pool can be less than amount of memory allocated to a compute node. Memory (such as double data rate (DDR) memory) is a high cost component in a data center. Accordingly, less money can be spent on memory across the system with compute nodes, local memory, and a memory pool.

Various embodiments provide memory thin provisioning in a memory pool of one or more memory DIMMs or devices. At any instance, any CPU can request and receive a full virtual allocation of memory pool (pages). Memory pool allocation is provided using a CPU's cache or local memory and memory pool as a backing. Allocation in a memory pool can occur when a write or swap of content of a cache line or page occurs. In some examples, movement of data from memory pool to cache is based on hotness or a higher number of accesses over time whereas movement of data from cache to memory pool is based on coldness or lower number of accesses over time.

Inclusive or exclusive content storage configurations can be applied. An inclusive cache configuration can include an entry in a cache also being stored in a memory pool whereas an exclusive cache configuration can provide an entry in either a cache or in a memory pool but not both. As multiple addresses can share use of an address in a cache and/or in a memory pool, a tag can be allocated to an address to identify whether content associated with an address is stored in cache or one of multiple possible locations in a memory pool.

Multiple CPUs can provide a same memory address to a memory pool. To differentiate among memory transactions that reference the same address from the same or different CPUs, a CPU can provide an address and a location tag to a memory pool and address translation can be applied to determine a particular physical address in a memory pool to access. In other words, a memory address A from a first CPU is translated to different physical address than the memory address A provided by a second CPU.

FIG. 1 depicts a data center in which disaggregated resources may cooperatively execute one or more workloads (e.g., applications on behalf of customers) includes multiple pods 110, 120, 130, 140, each of which includes one or more rows of racks. Of course, although data center 100 is shown with multiple pods, in some embodiments, the data center 100 may be embodied as a single pod. As described in more detail herein, each rack houses multiple sleds, each of which may be primarily equipped with a particular type of resource (e.g., memory devices, data storage devices, accelerator devices, general purpose processors), e.g., resources that can be logically coupled to form a composed node, which can act as, for example, a server. In the illustrative embodiment, the sleds in each pod 110, 120, 130, 140 are connected to multiple pod switches (e.g., switches that route data communications to and from sleds within the pod). The pod switches, in turn, connect with spine switches 150 that switch communications among pods (e.g., the pods 110, 120, 130, 140) in the data center 100. In some embodiments, the sleds may be connected with a fabric using Intel Omni-Path technology. In other embodiments, the sleds may be connected with other fabrics, such as InfiniBand or Ethernet. As described in more detail herein, resources within sleds in the data center 100 may be allocated to a group (referred to herein as a "managed node") containing resources from one or more sleds to be collectively utilized in the execution of a workload. The workload can execute as if the resources belonging to the managed node were located on the same sled. The resources in a managed node may belong to sleds belonging to different racks, and even to different pods 110, 120, 130, 140. As such, some resources of a single sled may be allocated to one managed node while other resources of the same sled are allocated to a different managed node (e.g., one processor assigned to one managed node and another processor of the same sled assigned to a different managed node).

A data center comprising disaggregated resources, such as data center 100, can be used in a wide variety of contexts, such as enterprise, government, cloud service provider, and communications service provider (e.g., Telco's), as well in a wide variety of sizes, from cloud service provider megadata centers that consume over 100,000 sq. ft. to single- or multi-rack installations for use in base stations.

The disaggregation of resources to sleds comprised predominantly of a single type of resource (e.g., compute sleds comprising primarily compute resources, memory sleds containing primarily memory resources), and the selective allocation and deallocation of the disaggregated resources to form a managed node assigned to execute a workload improves the operation and resource usage of the data center 100 relative to typical data centers comprised of hyperconverged servers containing compute, memory, storage and perhaps additional resources in a single chassis. For example, because sleds predominantly contain resources of a particular type, resources of a given type can be upgraded independently of other resources. Additionally, because different resources types (processors, storage, accelerators, etc.) typically have different refresh rates, greater resource utilization and reduced total cost of ownership may be achieved. For example, a data center operator can upgrade the processors throughout their facility by only swapping out the compute sleds. In such a case, accelerator and storage resources may not be contemporaneously upgraded and, rather, may be allowed to continue operating until those resources are scheduled for their own refresh. Resource utilization may also increase. For example, if managed nodes are composed based on requirements of the workloads that will be running on them, resources within a node are more likely to be fully utilized. Such utilization may allow for more managed nodes to run in a data center with a given set of resources, or for a data center expected to run a given set of workloads, to be built using fewer resources.

Figure 2:
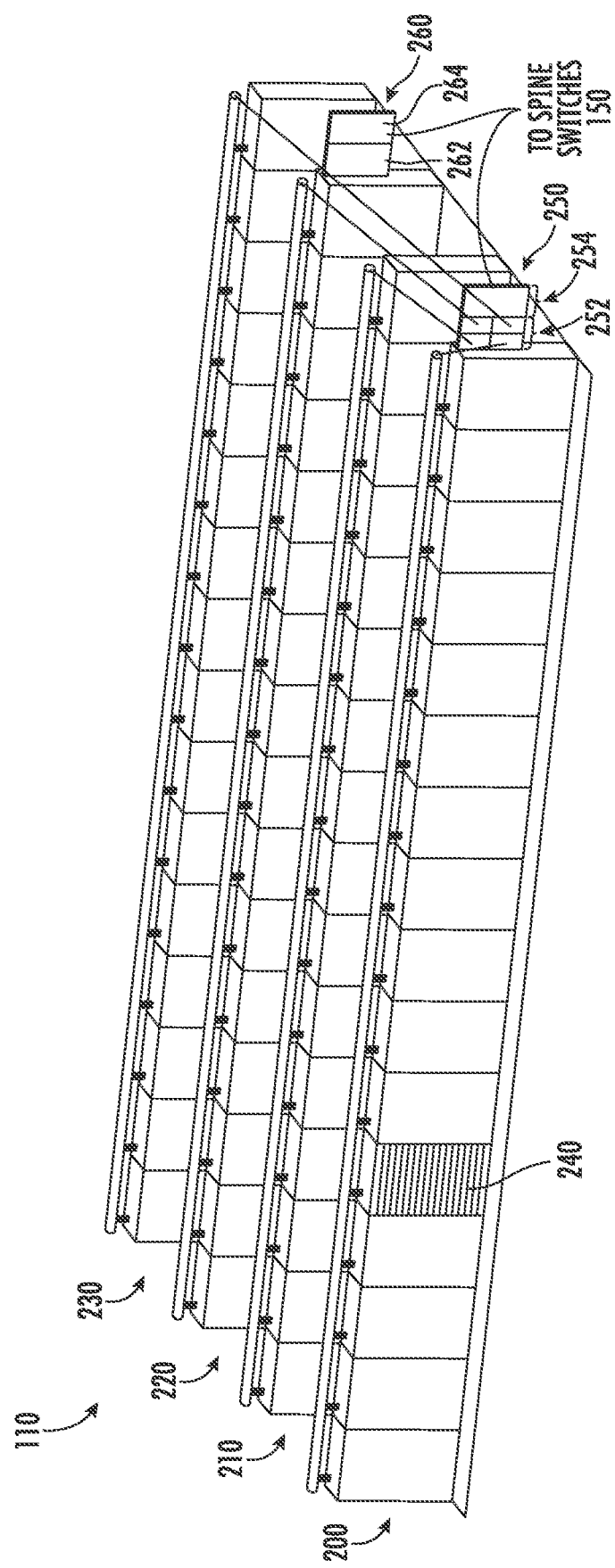
FIG. 2 is a simplified diagram of at least one embodiment of a pod that may be included in a data center.

FIG. 2 depicts a pod. A pod can include a set of rows 200, 210, 220, 230 of racks 240. Each rack 240 may house multiple sleds (e.g., sixteen sleds) and provide power and data connections to the housed sleds, as described in more detail herein. In the illustrative embodiment, the racks in each row 200, 210, 220, 230 are connected to multiple pod switches 250, 260. The pod switch 250 includes a set of ports 252 to which the sleds of the racks of the pod 110 are connected and another set of ports 254 that connect the pod 110 to the spine switches 150 to provide connectivity to other pods in the data center 100. Similarly, the pod switch 260 includes a set of ports 262 to which the sleds of the racks of the pod 110 are connected and a set of ports 264 that connect the pod 110 to the spine switches 150. As such, the use of the pair of switches 250, 260 provides an amount of redundancy to the pod 110. For example, if either of the switches 250, 260 fails, the sleds in the pod 110 may still maintain data communication with the remainder of the data center 100 (e.g., sleds of other pods) through the other switch 250, 260. Furthermore, in the illustrative embodiment, the switches 150, 250, 260 may be embodied as dual-mode optical switches, capable of routing both Ethernet protocol communications carrying Internet Protocol (IP) packets and communications according to a second, high-performance link-layer protocol (e.g., PCI Express) via optical signaling media of an optical fabric.

It should be appreciated that each of the other pods 120, 130, 140 (as well as any additional pods of the data center 100) may be similarly structured as, and have components similar to, the pod 110 shown in and described in regard to FIG. 2 (e.g., each pod may have rows of racks housing multiple sleds as described above). Additionally, while two pod switches 250, 260 are shown, it should be understood that in other embodiments, each pod 110, 120, 130, 140 may be connected to a different number of pod switches, providing even more failover capacity. Of course, in other embodiments, pods may be arranged differently than the rows-of-racks configuration shown in FIGS. 1-2. For example, a pod may be embodied as multiple sets of racks in which each set of racks is arranged radially, e.g., the racks are equidistant from a center switch.

Figure 3:
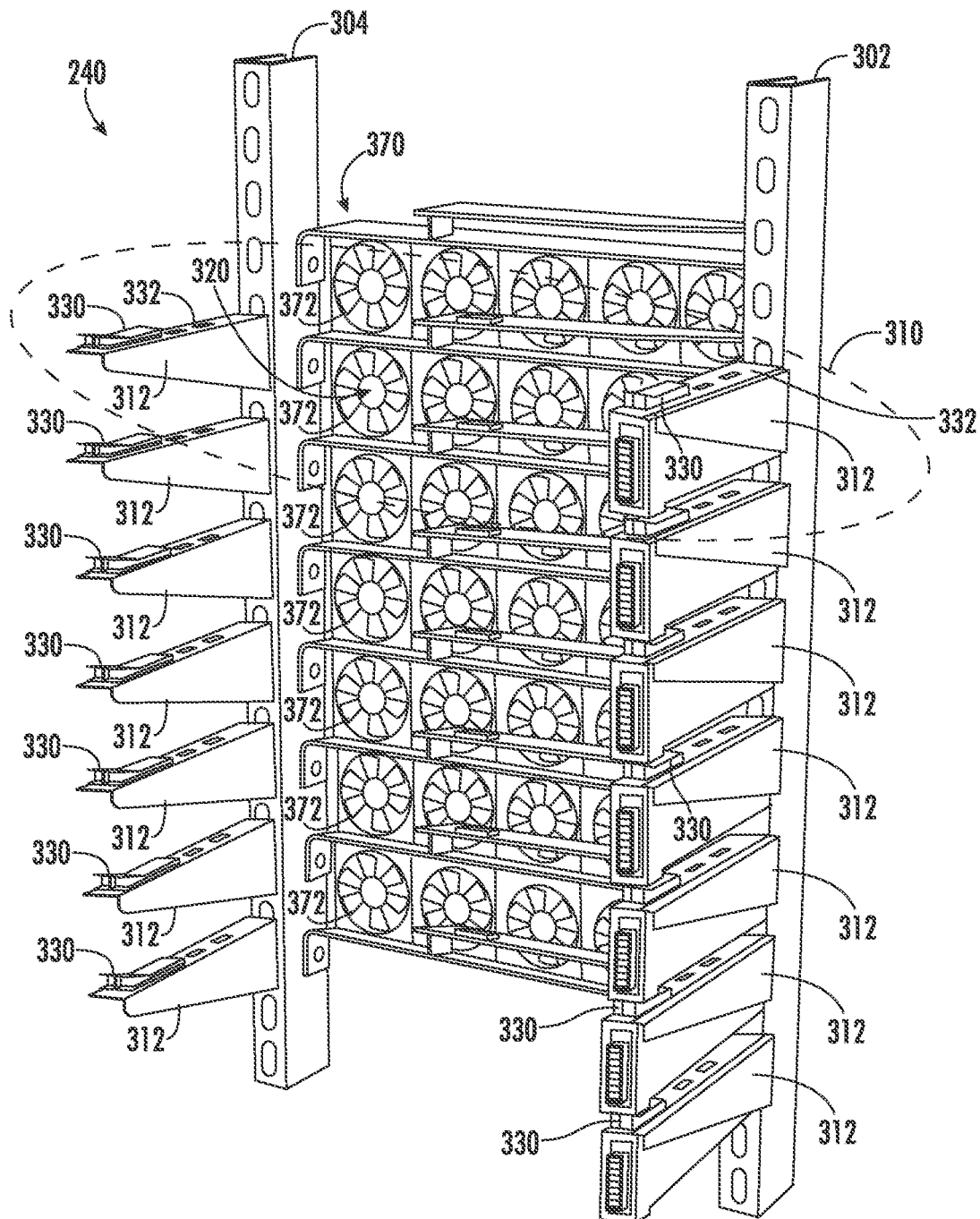
FIG. 3 is a perspective view of at least one embodiment of a rack that may be included in a pod.
Figure 4:
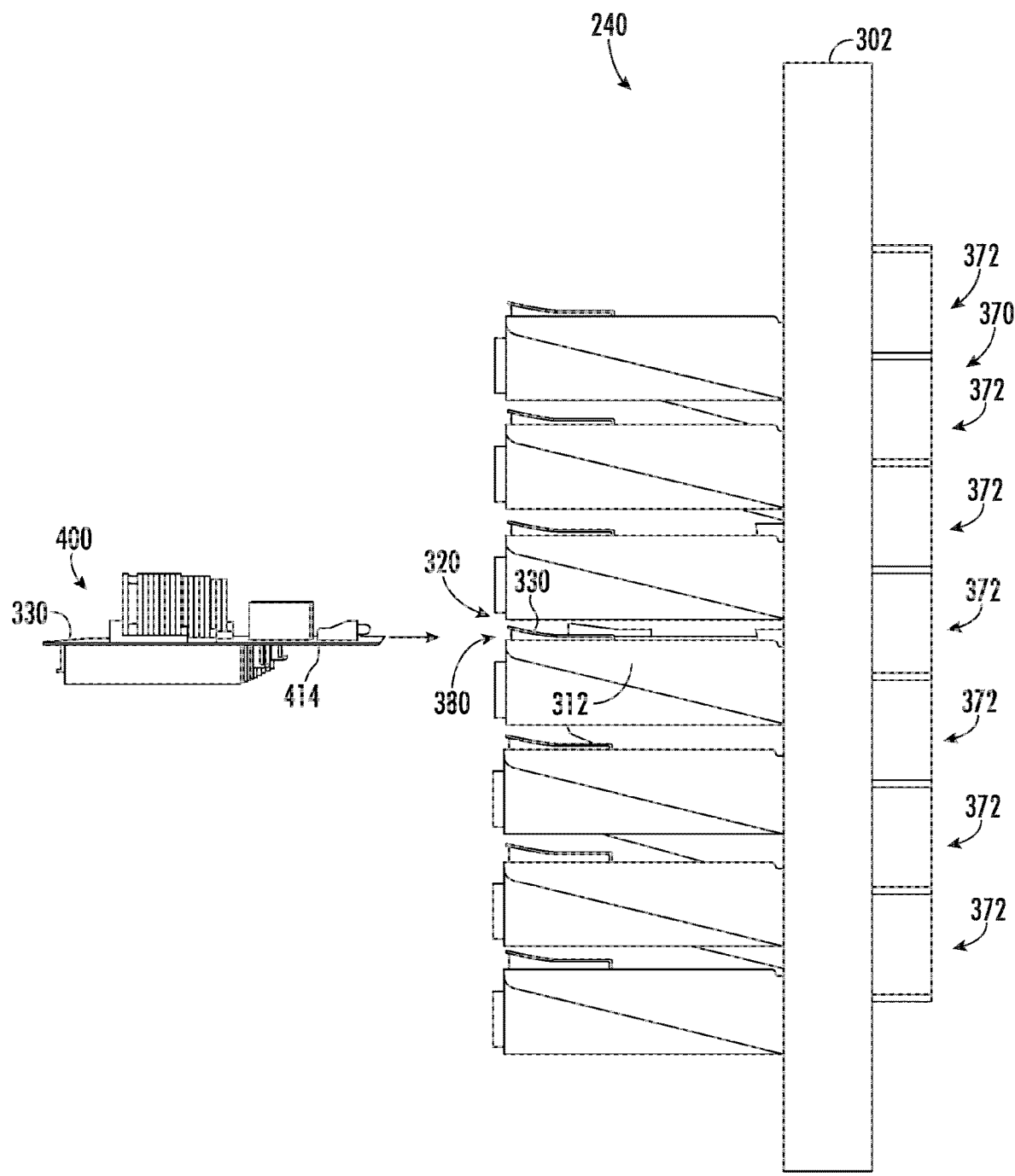
FIG. 4 is a side elevation view of a rack.
Figure 5:
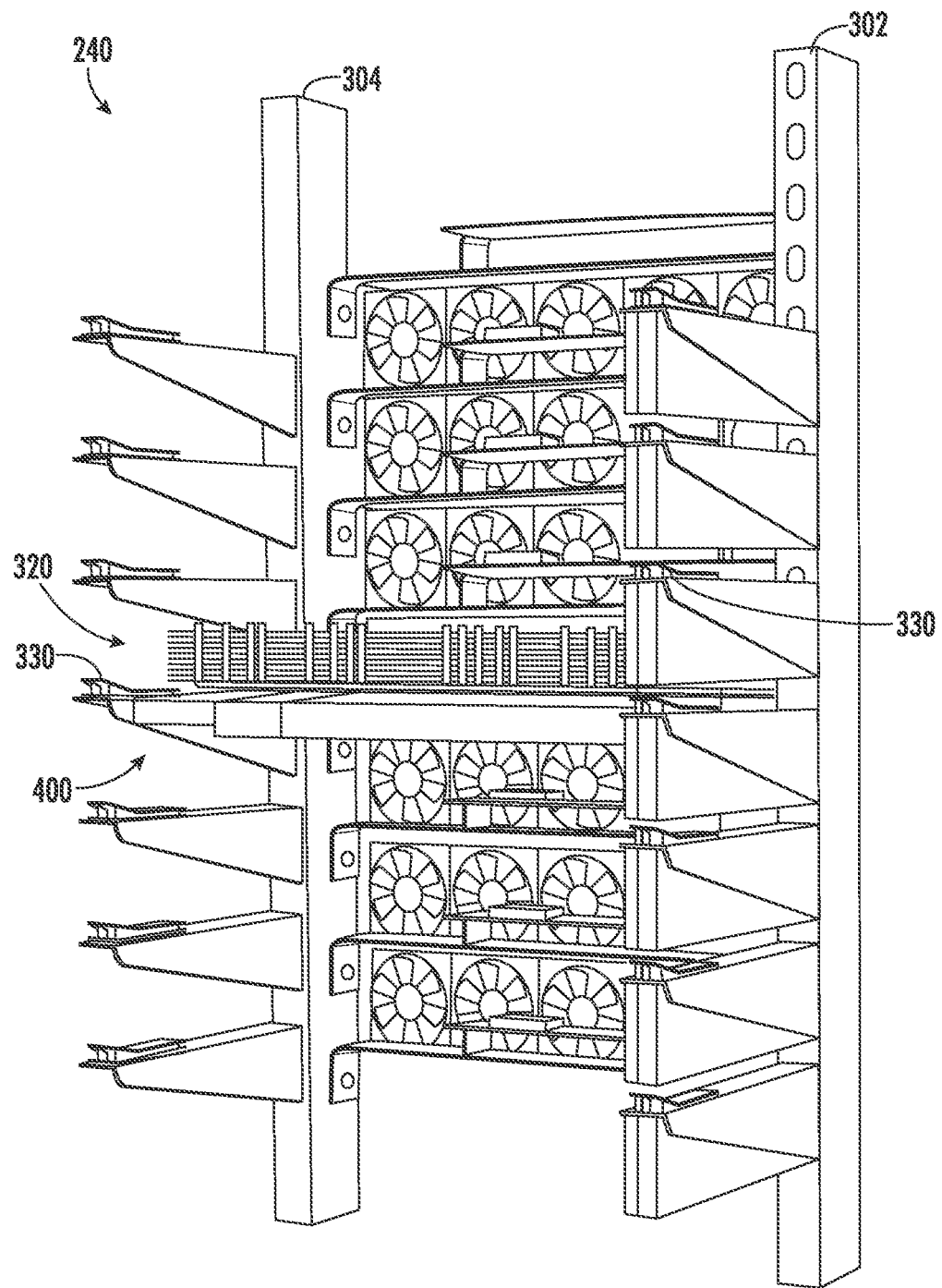
FIG. 5 is a perspective view of a rack having a sled mounted therein.

Referring now to FIGS. 3-5, each illustrative rack 240 of the data center 100 includes two elongated support posts 302, 304, which are arranged vertically. For example, the elongated support posts 302, 304 may extend upwardly from a floor of the data center 100 when deployed. The rack 240 also includes one or more horizontal pairs 310 of elongated support arms 312 (identified in FIG. 3 via a dashed ellipse) configured to support a sled of the data center 100 as discussed below. One elongated support arm 312 of the pair of elongated support arms 312 extends outwardly from the elongated support post 302 and the other elongated support arm 312 extends outwardly from the elongated support post 304.

In the illustrative embodiments, each sled of the data center 100 is embodied as a chassis-less sled. That is, each sled has a chassis-less circuit board substrate on which physical resources (e.g., processors, memory, accelerators, storage, etc.) are mounted as discussed in more detail below. As such, the rack 240 is configured to receive the chassis-less sleds. For example, each pair 310 of elongated support arms 312 defines a sled slot 320 of the rack 240, which is configured to receive a corresponding chassis-less sled. To do so, each illustrative elongated support arm 312 includes a circuit board guide 330 configured to receive the chassis-less circuit board substrate of the sled. Each circuit board guide 330 is secured to, or otherwise mounted to, a top side 332 of the corresponding elongated support arm 312. For example, in the illustrative embodiment, each circuit board guide 330 is mounted at a distal end of the corresponding elongated support arm 312 relative to the corresponding elongated support post 302, 304. For clarity of the Figures, not every circuit board guide 330 may be referenced in each Figure.

Each circuit board guide 330 includes an inner wall that defines a circuit board slot 380 configured to receive the chassis-less circuit board substrate of a sled 400 when the sled 400 is received in the corresponding sled slot 320 of the rack 240. To do so, as shown in FIG. 4, a user (or robot) aligns the chassis-less circuit board substrate of an illustrative chassis-less sled 400 to a sled slot 320. The user, or robot, may then slide the chassis-less circuit board substrate forward into the sled slot 320 such that each side edge 414 of the chassis-less circuit board substrate is received in a corresponding circuit board slot 380 of the circuit board guides 330 of the pair 310 of elongated support arms 312 that define the corresponding sled slot 320 as shown in FIG. 4. By having robotically accessible and robotically manipulatable sleds comprising disaggregated resources, each type of resource can be upgraded independently of each other and at their own optimized refresh rate. Furthermore, the sleds are configured to blindly mate with power and data communication cables in each rack 240, enhancing their ability to be quickly removed, upgraded, reinstalled, and/or replaced. As such, in some embodiments, the data center 100 may operate (e.g., execute workloads, undergo maintenance and/or upgrades, etc.) without human involvement on the data center floor. In other embodiments, a human may facilitate one or more maintenance or upgrade operations in the data center 100.

It should be appreciated that each circuit board guide 330 is dual sided. That is, each circuit board guide 330 includes an inner wall that defines a circuit board slot 380 on each side of the circuit board guide 330. In this way, each circuit board guide 330 can support a chassis-less circuit board substrate on either side. As such, a single additional elongated support post may be added to the rack 240 to turn the rack 240 into a two-rack solution that can hold twice as many sled slots 320 as shown in FIG. 3. The illustrative rack 240 includes seven pairs 310 of elongated support arms 312 that define a corresponding seven sled slots 320, each configured to receive and support a corresponding sled 400 as discussed above. Of course, in other embodiments, the rack 240 may include additional or fewer pairs 310 of elongated support arms 312 (e.g., additional or fewer sled slots 320). It should be appreciated that because the sled 400 is chassis-less, the sled 400 may have an overall height that is different than typical servers. As such, in some embodiments, the height of each sled slot 320 may be shorter than the height of a typical server (e.g., shorter than a single rank unit, "1U"). That is, the vertical distance between each pair 310 of elongated support arms 312 may be less than a standard rack unit "1U." Additionally, due to the relative decrease in height of the sled slots 320, the overall height of the rack 240 in some embodiments may be shorter than the height of traditional rack enclosures. For example, in some embodiments, each of the elongated support posts 302, 304 may have a length of six feet or less. Again, in other embodiments, the rack 240 may have different dimensions. For example, in some embodiments, the vertical distance between each pair 310 of elongated support arms 312 may be greater than a standard rack until "1U". In such embodiments, the increased vertical distance between the sleds allows for larger heat sinks to be attached to the physical resources and for larger fans to be used (e.g., in the fan array 370 described below) for cooling each sled, which in turn can allow the physical resources to operate at increased power levels. Further, it should be appreciated that the rack 240 does not include any walls, enclosures, or the like. Rather, the rack 240 is an enclosure-less rack that is opened to the local environment. Of course, in some cases, an end plate may be attached to one of the elongated support posts 302, 304 in those situations in which the rack 240 forms an end-of-row rack in the data center 100.

In some embodiments, various interconnects may be routed upwardly or downwardly through the elongated support posts 302, 304. To facilitate such routing, each elongated support post 302, 304 includes an inner wall that defines an inner chamber in which interconnects may be located. The interconnects routed through the elongated support posts 302, 304 may be embodied as any type of interconnects including, but not limited to, data or communication interconnects to provide communication connections to each sled slot 320, power interconnects to provide power to each sled slot 320, and/or other types of interconnects.

The rack 240, in the illustrative embodiment, includes a support platform on which a corresponding optical data connector (not shown) is mounted. Each optical data connector is associated with a corresponding sled slot 320 and is configured to mate with an optical data connector of a corresponding sled 400 when the sled 400 is received in the corresponding sled slot 320. In some embodiments, optical connections between components (e.g., sleds, racks, and switches) in the data center 100 are made with a blind mate optical connection. For example, a door on each cable may prevent dust from contaminating the fiber inside the cable. In the process of connecting to a blind mate optical connector mechanism, the door is pushed open when the end of the cable approaches or enters the connector mechanism. Subsequently, the optical fiber inside the cable may enter a gel within the connector mechanism and the optical fiber of one cable comes into contact with the optical fiber of another cable within the gel inside the connector mechanism.

The illustrative rack 240 also includes a fan array 370 coupled to the cross-support arms of the rack 240. The fan array 370 includes one or more rows of cooling fans 372, which are aligned in a horizontal line between the elongated support posts 302, 304. In the illustrative embodiment, the fan array 370 includes a row of cooling fans 372 for each sled slot 320 of the rack 240. As discussed above, each sled 400 does not include any on-board cooling system in the illustrative embodiment and, as such, the fan array 370 provides cooling for each sled 400 received in the rack 240.

Each rack 240, in the illustrative embodiment, also includes a power supply associated with each sled slot 320. Each power supply is secured to one of the elongated support arms 312 of the pair 310 of elongated support arms 312 that define the corresponding sled slot 320. For example, the rack 240 may include a power supply coupled or secured to each elongated support arm 312 extending from the elongated support post 302. Each power supply includes a power connector configured to mate with a power connector of the sled 400 when the sled 400 is received in the corresponding sled slot 320. In the illustrative embodiment, the sled 400 does not include any on-board power supply and, as such, the power supplies provided in the rack 240 supply power to corresponding sleds 400 when mounted to the rack 240. Each power supply is configured to satisfy the power requirements for its associated sled, which can vary from sled to sled. Additionally, the power supplies provided in the rack 240 can operate independent of each other. That is, within a single rack, a first power supply providing power to a compute sled can provide power levels that are different than power levels supplied by a second power supply providing power to an accelerator sled. The power supplies may be controllable at the sled level or rack level, and may be controlled locally by components on the associated sled or remotely, such as by another sled or an orchestrator.

Figure 6:
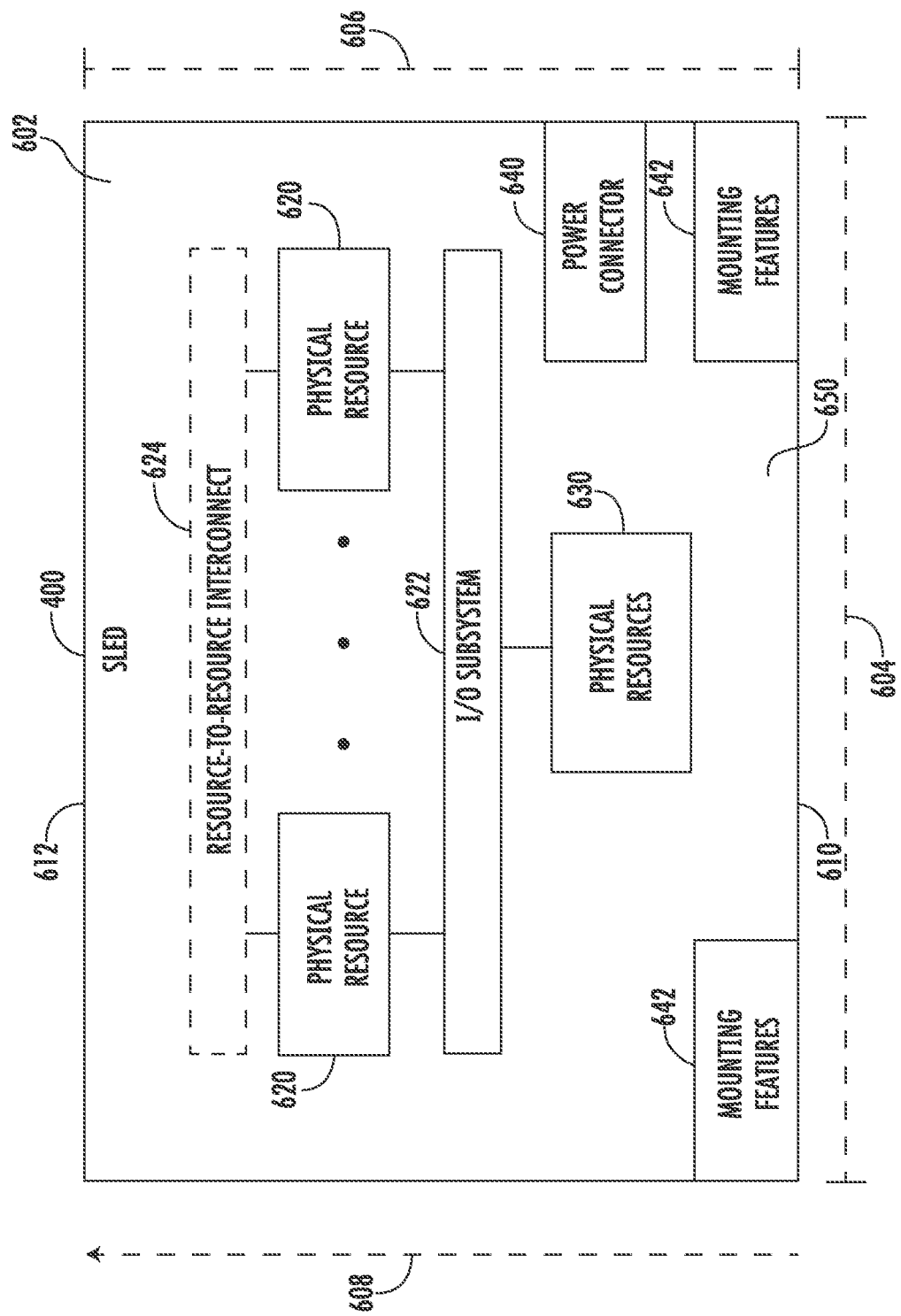
FIG. 6 is a simplified block diagram of at least one embodiment of a top side of a sled.

Referring now to FIG. 6, the sled 400, in the illustrative embodiment, is configured to be mounted in a corresponding rack 240 of the data center 100 as discussed above. In some embodiments, each sled 400 may be optimized or otherwise configured for performing particular tasks, such as compute tasks, acceleration tasks, data storage tasks, etc. For example, the sled 400 may be embodied as a compute sled 800 as discussed below in regard to FIGS. 8-9, an accelerator sled 1000 as discussed below in regard to FIGS. 10-11, a storage sled 1200 as discussed below in regard to FIGS. 12-13, or as a sled optimized or otherwise configured to perform other specialized tasks, such as a memory sled 1400, discussed below in regard to FIG. 14.

As discussed above, the illustrative sled 400 includes a chassis-less circuit board substrate 602, which supports various physical resources (e.g., electrical components) mounted thereon. It should be appreciated that the circuit board substrate 602 is "chassis-less" in that the sled 400 does not include a housing or enclosure. Rather, the chassis-less circuit board substrate 602 is open to the local environment. The chassis-less circuit board substrate 602 may be formed from any material capable of supporting the various electrical components mounted thereon. For example, in an illustrative embodiment, the chassis-less circuit board substrate 602 is formed from an FR-4 glass-reinforced epoxy laminate material. Of course, other materials may be used to form the chassis-less circuit board substrate 602 in other embodiments.

As discussed in more detail below, the chassis-less circuit board substrate 602 includes multiple features that improve the thermal cooling characteristics of the various electrical components mounted on the chassis-less circuit board substrate 602. As discussed, the chassis-less circuit board substrate 602 does not include a housing or enclosure, which may improve the airflow over the electrical components of the sled 400 by reducing those structures that may inhibit air flow. For example, because the chassis-less circuit board substrate 602 is not positioned in an individual housing or enclosure, there is no vertically-arranged backplane (e.g., a backplate of the chassis) attached to the chassis-less circuit board substrate 602, which could inhibit air flow across the electrical components. Additionally, the chassis-less circuit board substrate 602 has a geometric shape configured to reduce the length of the airflow path across the electrical components mounted to the chassis-less circuit board substrate 602. For example, the illustrative chassis-less circuit board substrate 602 has a width 604 that is greater than a depth 606 of the chassis-less circuit board substrate 602. In one particular embodiment, for example, the chassis-less circuit board substrate 602 has a width of about 21 inches and a depth of about 9 inches, compared to a typical server that has a width of about 17 inches and a depth of about 39 inches. As such, an airflow path 608 that extends from a front edge 610 of the chassis-less circuit board substrate 602 toward a rear edge 612 has a shorter distance relative to typical servers, which may improve the thermal cooling characteristics of the sled 400. Furthermore, although not illustrated in FIG. 6, the various physical resources mounted to the chassis-less circuit board substrate 602 are mounted in corresponding locations such that no two substantively heat-producing electrical components shadow each other as discussed in more detail below. That is, no two electrical components, which produce appreciable heat during operation (e.g., greater than a nominal heat sufficient enough to adversely impact the cooling of another electrical component), are mounted to the chassis-less circuit board substrate 602 linearly in-line with each other along the direction of the airflow path 608 (e.g., along a direction extending from the front edge 610 toward the rear edge 612 of the chassis-less circuit board substrate 602).

As discussed above, the illustrative sled 400 includes one or more physical resources 620 mounted to a top side 650 of the chassis-less circuit board substrate 602. Although two physical resources 620 are shown in FIG. 6, it should be appreciated that the sled 400 may include one, two, or more physical resources 620 in other embodiments. The physical resources 620 may be embodied as any type of processor, controller, or other compute circuit capable of performing various tasks such as compute functions and/or controlling the functions of the sled 400 depending on, for example, the type or intended functionality of the sled 400. For example, as discussed in more detail below, the physical resources 620 may be embodied as high-performance processors in embodiments in which the sled 400 is embodied as a compute sled, as accelerator co-processors or circuits in embodiments in which the sled 400 is embodied as an accelerator sled, storage controllers in embodiments in which the sled 400 is embodied as a storage sled, or a set of memory devices in embodiments in which the sled 400 is embodied as a memory sled.

The sled 400 also includes one or more additional physical resources 630 mounted to the top side 650 of the chassis-less circuit board substrate 602. In the illustrative embodiment, the additional physical resources include a network interface controller (NIC) as discussed in more detail below. Of course, depending on the type and functionality of the sled 400, the physical resources 630 may include additional or other electrical components, circuits, and/or devices in other embodiments.

The physical resources 620 are communicatively coupled to the physical resources 630 via an input/output (I/O) subsystem 622. The I/O subsystem 622 may be embodied as circuitry and/or components to facilitate input/output operations with the physical resources 620, the physical resources 630, and/or other components of the sled 400. For example, the I/O subsystem 622 may be embodied as, or otherwise include, memory controller hubs, input/output control hubs, integrated sensor hubs, firmware devices, communication links (e.g., point-to-point links, bus links, wires, cables, waveguides, light guides, printed circuit board traces, etc.), and/or other components and subsystems to facilitate the input/output operations. In the illustrative embodiment, the I/O subsystem 622 is embodied as, or otherwise includes, a double data rate 4 (DDR4) data bus or a DDR5 data bus.

In some embodiments, the sled 400 may also include a resource-to-resource interconnect 624. The resource-to-resource interconnect 624 may be embodied as any type of communication interconnect capable of facilitating resource-to-resource communications. In the illustrative embodiment, the resource-to-resource interconnect 624 is embodied as a high-speed point-to-point interconnect (e.g., faster than the I/O subsystem 622). For example, the resource-to-resource interconnect 624 may be embodied as a QuickPath Interconnect (QPI), an UltraPath Interconnect (UPI), PCI express (PCIe), or other high-speed point-to-point interconnect dedicated to resource-to-resource communications.

The sled 400 also includes a power connector 640 configured to mate with a corresponding power connector of the rack 240 when the sled 400 is mounted in the corresponding rack 240. The sled 400 receives power from a power supply of the rack 240 via the power connector 640 to supply power to the various electrical components of the sled 400. That is, the sled 400 does not include any local power supply (e.g., an on-board power supply) to provide power to the electrical components of the sled 400. The exclusion of a local or on-board power supply facilitates the reduction in the overall footprint of the chassis-less circuit board substrate 602, which may increase the thermal cooling characteristics of the various electrical components mounted on the chassis-less circuit board substrate 602 as discussed above. In some embodiments, voltage regulators are placed on a bottom side 750 (see FIG. 7) of the chassis-less circuit board substrate 602 directly opposite of the processors 820 (see FIG. 8), and power is routed from the voltage regulators to the processors 820 by vias extending through the circuit board substrate 602. Such a configuration provides an increased thermal budget, additional current and/or voltage, and better voltage control relative to typical printed circuit boards in which processor power is delivered from a voltage regulator, in part, by printed circuit traces.

In some embodiments, the sled 400 may also include mounting features 642 configured to mate with a mounting arm, or other structure, of a robot to facilitate the placement of the sled 600 in a rack 240 by the robot. The mounting features 642 may be embodied as any type of physical structures that allow the robot to grasp the sled 400 without damaging the chassis-less circuit board substrate 602 or the electrical components mounted thereto. For example, in some embodiments, the mounting features 642 may be embodied as non-conductive pads attached to the chassis-less circuit board substrate 602. In other embodiments, the mounting features may be embodied as brackets, braces, or other similar structures attached to the chassis-less circuit board substrate 602. The particular number, shape, size, and/or make-up of the mounting feature 642 may depend on the design of the robot configured to manage the sled 400.

Figure 7:
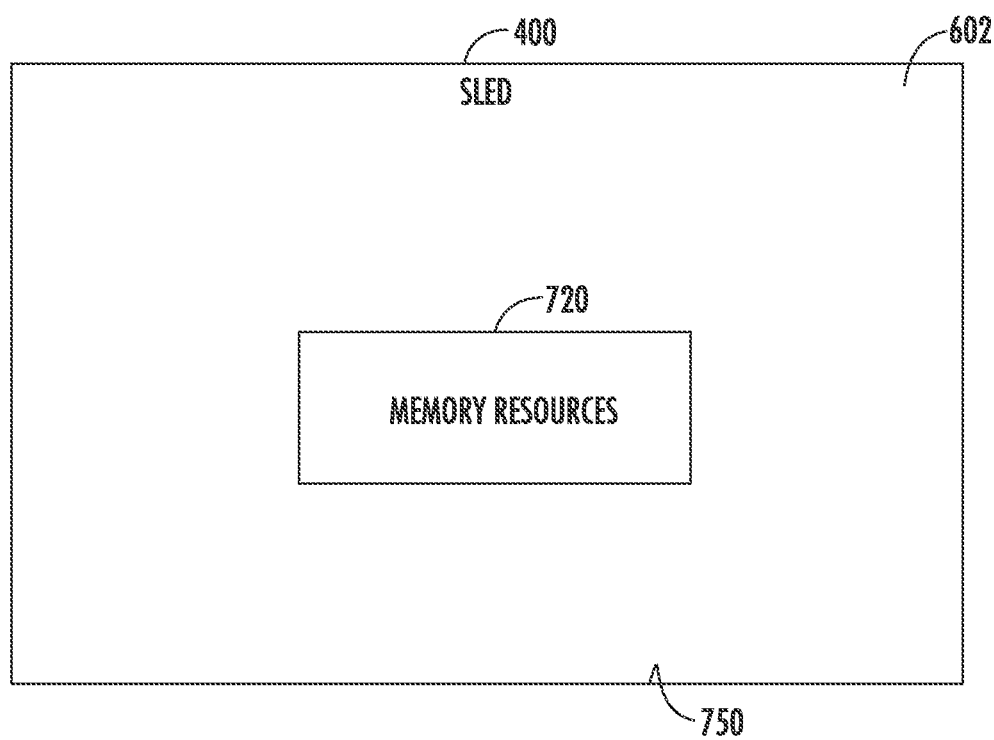
FIG. 7 is a simplified block diagram of at least one embodiment of a bottom side of a sled.

Referring now to FIG. 7, in addition to the physical resources 630 mounted on the top side 650 of the chassis-less circuit board substrate 602, the sled 400 also includes one or more memory devices 720 mounted to a bottom side 750 of the chassis-less circuit board substrate 602. That is, the chassis-less circuit board substrate 602 is embodied as a double-sided circuit board. The physical resources 620 are communicatively coupled to the memory devices 720 via the I/O subsystem 622. For example, the physical resources 620 and the memory devices 720 may be communicatively coupled by one or more vias extending through the chassis-less circuit board substrate 602. Each physical resource 620 may be communicatively coupled to a different set of one or more memory devices 720 in some embodiments. Alternatively, in other embodiments, each physical resource 620 may be communicatively coupled to each memory device 720.

The memory devices 720 may be embodied as any type of memory device capable of storing data for the physical resources 620 during operation of the sled 400, such as any type of volatile (e.g., dynamic random access memory (DRAM), etc.) or non-volatile memory. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A block can be any size such as but not limited to 2 KB, 4 KB, 8 KB, and so forth. A memory device may also include next-generation nonvolatile devices, such as Intel Optane® memory or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, the memory device may comprise a transistor-less stackable cross point architecture in which memory cells sit at the intersection of word lines and bit lines and are individually addressable and in which bit storage is based on a change in bulk resistance.

Figure 8:
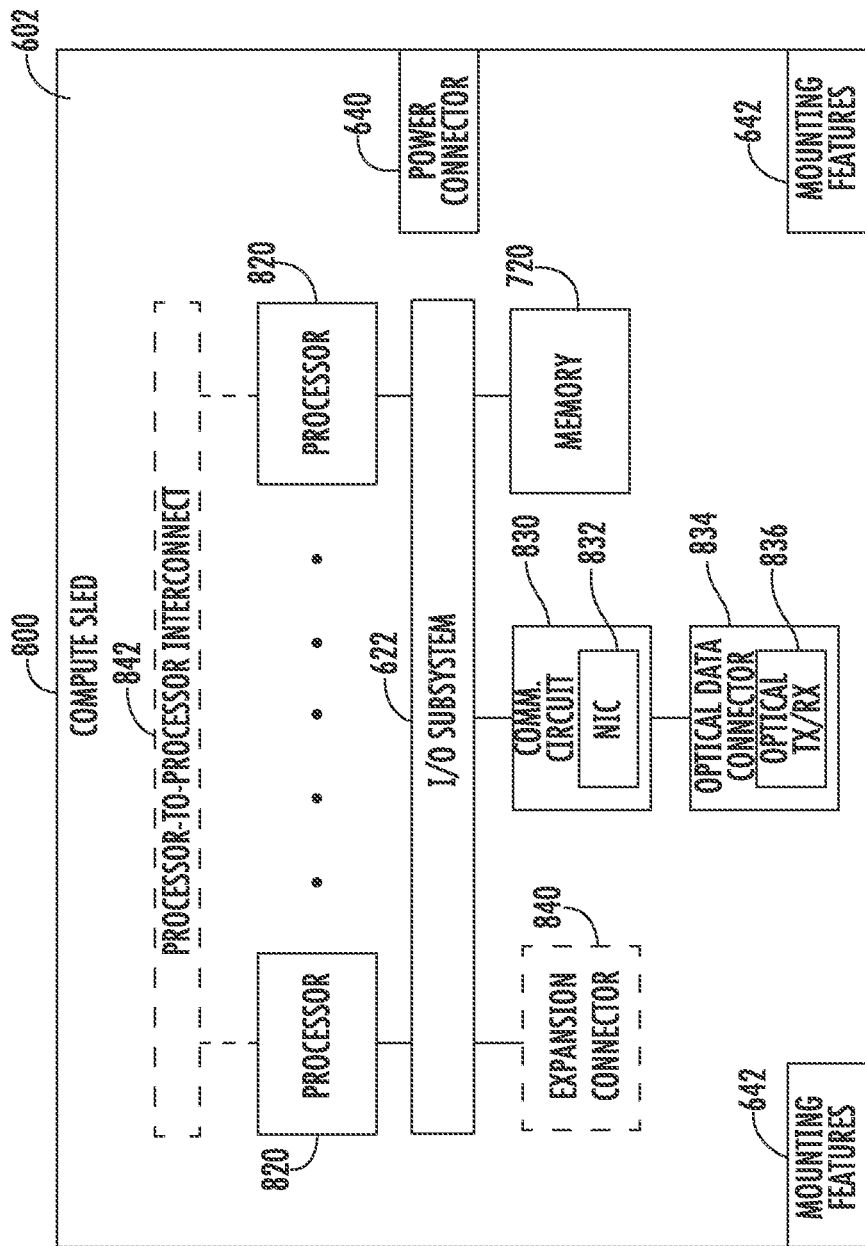
FIG. 8 is a simplified block diagram of at least one embodiment of a compute sled.

Referring now to FIG. 8, in some embodiments, the sled 400 may be embodied as a compute sled 800. The compute sled 800 is optimized, or otherwise configured, to perform compute tasks. Of course, as discussed above, the compute sled 800 may rely on other sleds, such as acceleration sleds and/or storage sleds, to perform such compute tasks. The compute sled 800 includes various physical resources (e.g., electrical components) similar to the physical resources of the sled 400, which have been identified in FIG. 8 using the same reference numbers. The description of such components provided above in regard to FIGS. 6 and 7 applies to the corresponding components of the compute sled 800 and is not repeated herein for clarity of the description of the compute sled 800.

In the illustrative compute sled 800, the physical resources 620 are embodied as processors 820. Although only two processors 820 are shown in FIG. 8, it should be appreciated that the compute sled 800 may include additional processors 820 in other embodiments. Illustratively, the processors 820 are embodied as high-performance processors 820 and may be configured to operate at a relatively high power rating. Although the processors 820 generate additional heat operating at power ratings greater than typical processors (which operate at around 155-230 W), the enhanced thermal cooling characteristics of the chassis-less circuit board substrate 602 discussed above facilitate the higher power operation. For example, in the illustrative embodiment, the processors 820 are configured to operate at a power rating of at least 250 W. In some embodiments, the processors 820 may be configured to operate at a power rating of at least 350 W.

In some embodiments, the compute sled 800 may also include a processor-to-processor interconnect 842. Similar to the resource-to-resource interconnect 624 of the sled 400 discussed above, the processor-to-processor interconnect 842 may be embodied as any type of communication interconnect capable of facilitating processor-to-processor interconnect 842 communications. In the illustrative embodiment, the processor-to-processor interconnect 842 is embodied as a high-speed point-to-point interconnect (e.g., faster than the I/O subsystem 622). For example, the processor-to-processor interconnect 842 may be embodied as a QuickPath Interconnect (QPI), an UltraPath Interconnect (UPI), or other high-speed point-to-point interconnect dedicated to processor-to-processor communications (e.g., PCIe).

The compute sled 800 also includes a communication circuit 830. The illustrative communication circuit 830 includes a network interface controller (NIC) 832, which may also be referred to as a host fabric interface (HFI). The NIC 832 may be embodied as, or otherwise include, any type of integrated circuit, discrete circuits, controller chips, chipsets, add-in-boards, daughtercards, network interface cards, or other devices that may be used by the compute sled 800 to connect with another compute device (e.g., with other sleds 400). In some embodiments, the NIC 832 may be embodied as part of a system-on-a-chip (SoC) that includes one or more processors, or included on a multichip package that also contains one or more processors. In some embodiments, the NIC 832 may include a local processor (not shown) and/or a local memory (not shown) that are both local to the NIC 832. In such embodiments, the local processor of the NIC 832 may be capable of performing one or more of the functions of the processors 820. Additionally or alternatively, in such embodiments, the local memory of the NIC 832 may be integrated into one or more components of the compute sled at the board level, socket level, chip level, and/or other levels.

The communication circuit 830 is communicatively coupled to an optical data connector 834. The optical data connector 834 is configured to mate with a corresponding optical data connector of the rack 240 when the compute sled 800 is mounted in the rack 240. Illustratively, the optical data connector 834 includes a plurality of optical fibers which lead from a mating surface of the optical data connector 834 to an optical transceiver 836. The optical transceiver 836 is configured to convert incoming optical signals from the rack-side optical data connector to electrical signals and to convert electrical signals to outgoing optical signals to the rack-side optical data connector. Although shown as forming part of the optical data connector 834 in the illustrative embodiment, the optical transceiver 836 may form a portion of the communication circuit 830 in other embodiments.

In some embodiments, the compute sled 800 may also include an expansion connector 840. In such embodiments, the expansion connector 840 is configured to mate with a corresponding connector of an expansion chassis-less circuit board substrate to provide additional physical resources to the compute sled 800. The additional physical resources may be used, for example, by the processors 820 during operation of the compute sled 800. The expansion chassis-less circuit board substrate may be substantially similar to the chassis-less circuit board substrate 602 discussed above and may include various electrical components mounted thereto. The particular electrical components mounted to the expansion chassis-less circuit board substrate may depend on the intended functionality of the expansion chassis-less circuit board substrate. For example, the expansion chassis-less circuit board substrate may provide additional compute resources, memory resources, and/or storage resources. As such, the additional physical resources of the expansion chassis-less circuit board substrate may include, but is not limited to, processors, memory devices, storage devices, and/or accelerator circuits including, for example, field programmable gate arrays (FPGA), application-specific integrated circuits (ASICs), security co-processors, graphics processing units (GPUs), machine learning circuits, or other specialized processors, controllers, devices, and/or circuits.

Figure 9:
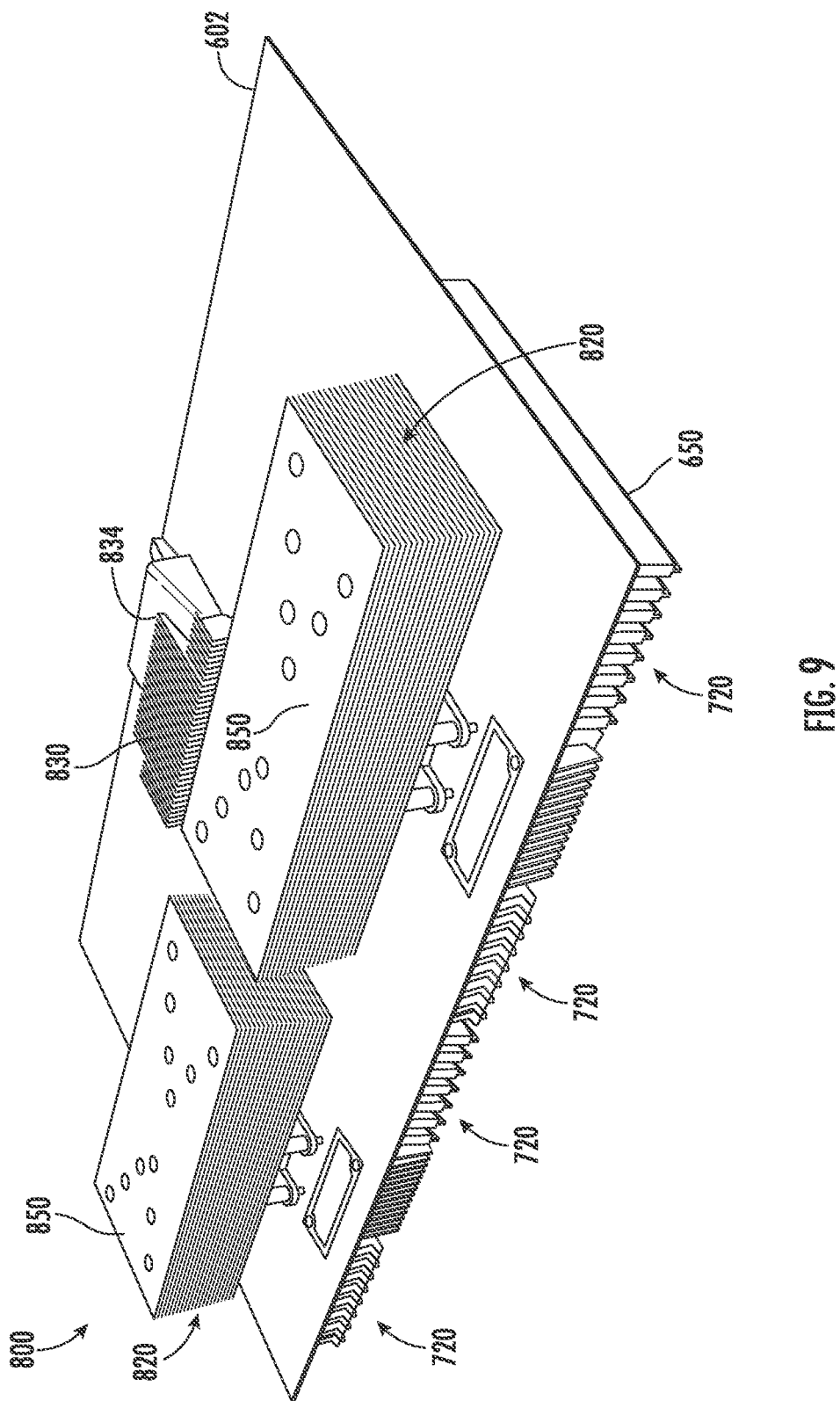
FIG. 9 is a top perspective view of at least one embodiment of a compute sled.

Referring now to FIG. 9, an illustrative embodiment of the compute sled 800 is shown. As shown, the processors 820, communication circuit 830, and optical data connector 834 are mounted to the top side 650 of the chassis-less circuit board substrate 602. Any suitable attachment or mounting technology may be used to mount the physical resources of the compute sled 800 to the chassis-less circuit board substrate 602. For example, the various physical resources may be mounted in corresponding sockets (e.g., a processor socket), holders, or brackets. In some cases, some of the electrical components may be directly mounted to the chassis-less circuit board substrate 602 via soldering or similar techniques.

As discussed above, the individual processors 820 and communication circuit 830 are mounted to the top side 650 of the chassis-less circuit board substrate 602 such that no two heat-producing, electrical components shadow each other. In the illustrative embodiment, the processors 820 and communication circuit 830 are mounted in corresponding locations on the top side 650 of the chassis-less circuit board substrate 602 such that no two of those physical resources are linearly in-line with others along the direction of the airflow path 608. It should be appreciated that, although the optical data connector 834 is in-line with the communication circuit 830, the optical data connector 834 produces no or nominal heat during operation.

The memory devices 720 of the compute sled 800 are mounted to the bottom side 750 of the of the chassis-less circuit board substrate 602 as discussed above in regard to the sled 400. Although mounted to the bottom side 750, the memory devices 720 are communicatively coupled to the processors 820 located on the top side 650 via the I/O subsystem 622. Because the chassis-less circuit board substrate 602 is embodied as a double-sided circuit board, the memory devices 720 and the processors 820 may be communicatively coupled by one or more vias, connectors, or other mechanisms extending through the chassis-less circuit board substrate 602. Of course, each processor 820 may be communicatively coupled to a different set of one or more memory devices 720 in some embodiments. Alternatively, in other embodiments, each processor 820 may be communicatively coupled to each memory device 720. In some embodiments, the memory devices 720 may be mounted to one or more memory mezzanines on the bottom side of the chassis-less circuit board substrate 602 and may interconnect with a corresponding processor 820 through a ball-grid array.

Each of the processors 820 includes a heatsink 850 secured thereto. Due to the mounting of the memory devices 720 to the bottom side 750 of the chassis-less circuit board substrate 602 (as well as the vertical spacing of the sleds 400 in the corresponding rack 240), the top side 650 of the chassis-less circuit board substrate 602 includes additional "free" area or space that facilitates the use of heatsinks 850 having a larger size relative to traditional heatsinks used in typical servers. Additionally, due to the improved thermal cooling characteristics of the chassis-less circuit board substrate 602, none of the processor heatsinks 850 include cooling fans attached thereto. That is, each of the heatsinks 850 is embodied as a fan-less heatsink. In some embodiments, the heat sinks 850 mounted atop the processors 820 may overlap with the heat sink attached to the communication circuit 830 in the direction of the airflow path 608 due to their increased size, as illustratively suggested by FIG. 9.

Figure 10:
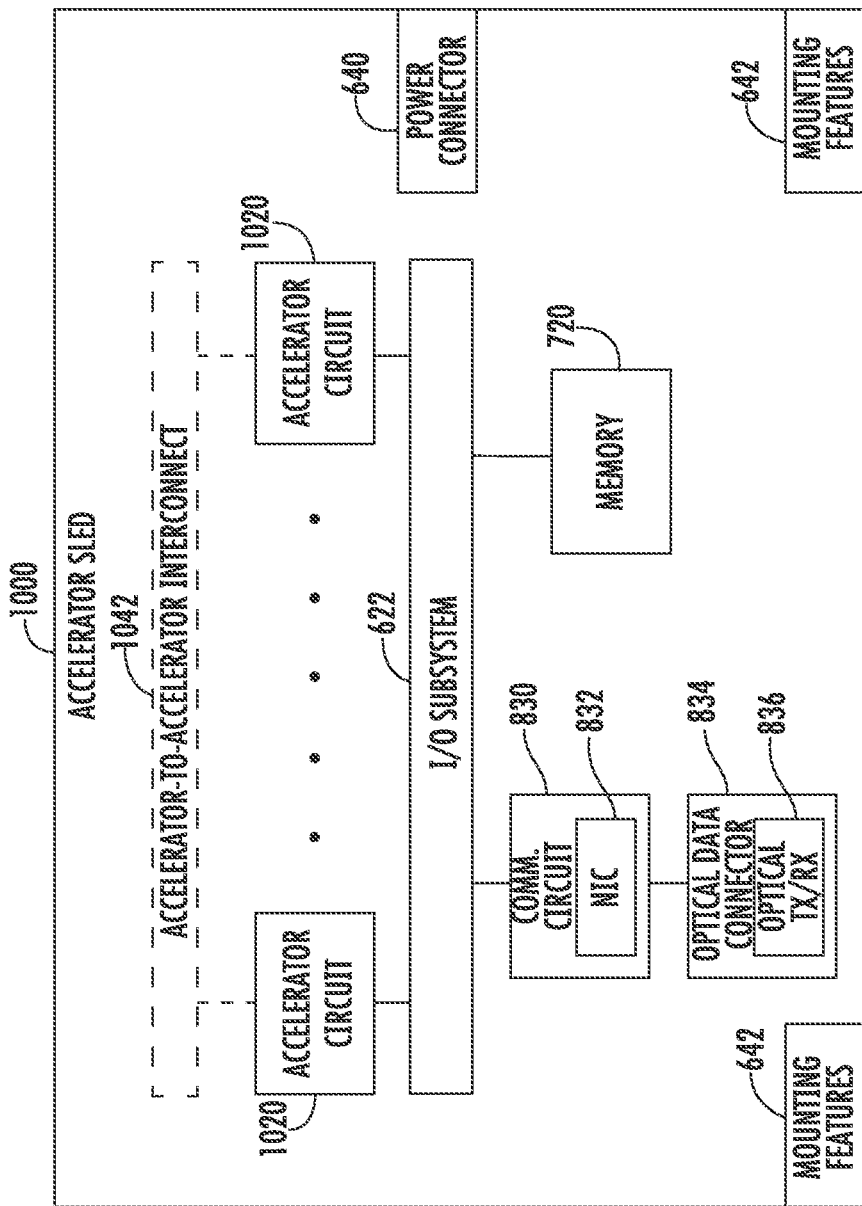
FIG. 10 is a simplified block diagram of at least one embodiment of an accelerator sled usable in a data center.

Referring now to FIG. 10, in some embodiments, the sled 400 may be embodied as an accelerator sled 1000. The accelerator sled 1000 is configured, to perform specialized compute tasks, such as machine learning, encryption, hashing, or other computational-intensive task. In some embodiments, for example, a compute sled 800 may offload tasks to the accelerator sled 1000 during operation. The accelerator sled 1000 includes various components similar to components of the sled 400 and/or compute sled 800, which have been identified in FIG. 10 using the same reference numbers. The description of such components provided above in regard to FIGS. 6, 7, and 8 apply to the corresponding components of the accelerator sled 1000 and is not repeated herein for clarity of the description of the accelerator sled 1000.

Figure 11:
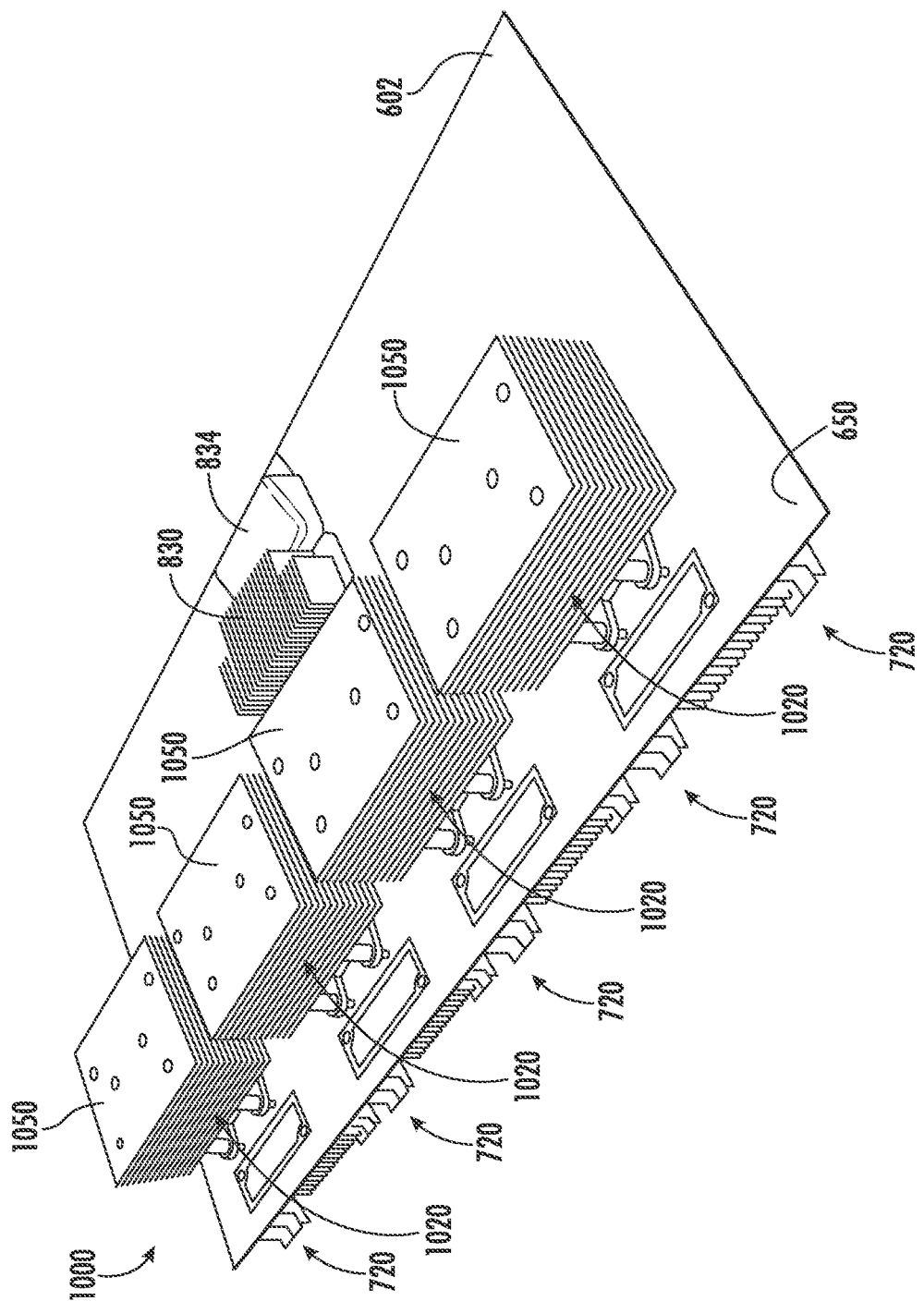
FIG. 11 is a top perspective view of at least one embodiment of an accelerator sled.

In the illustrative accelerator sled 1000, the physical resources 620 are embodied as accelerator circuits 1020. Although only two accelerator circuits 1020 are shown in FIG. 10, it should be appreciated that the accelerator sled 1000 may include additional accelerator circuits 1020 in other embodiments. For example, as shown in FIG. 11, the accelerator sled 1000 may include four accelerator circuits 1020 in some embodiments. The accelerator circuits 1020 may be embodied as any type of processor, co-processor, compute circuit, or other device capable of performing compute or processing operations. For example, the accelerator circuits 1020 may be embodied as, for example, central processing units, cores, field programmable gate arrays (FPGA), application-specific integrated circuits (ASICs), programmable control logic (PCL), security co-processors, graphics processing units (GPUs), neuromorphic processor units, quantum computers, machine learning circuits, or other specialized processors, controllers, devices, and/or circuits.

In some embodiments, the accelerator sled 1000 may also include an accelerator-to-accelerator interconnect 1042. Similar to the resource-to-resource interconnect 624 of the sled 600 discussed above, the accelerator-to-accelerator interconnect 1042 may be embodied as any type of communication interconnect capable of facilitating accelerator-to-accelerator communications. In the illustrative embodiment, the accelerator-to-accelerator interconnect 1042 is embodied as a high-speed point-to-point interconnect (e.g., faster than the I/O subsystem 622). For example, the accelerator-to-accelerator interconnect 1042 may be embodied as a QuickPath Interconnect (QPI), an UltraPath Interconnect (UPI), or other high-speed point-to-point interconnect dedicated to processor-to-processor communications. In some embodiments, the accelerator circuits 1020 may be daisy-chained with a primary accelerator circuit 1020 connected to the NIC 832 and memory 720 through the I/O subsystem 622 and a secondary accelerator circuit 1020 connected to the NIC 832 and memory 720 through a primary accelerator circuit 1020.

Referring now to FIG. 11, an illustrative embodiment of the accelerator sled 1000 is shown. As discussed above, the accelerator circuits 1020, communication circuit 830, and optical data connector 834 are mounted to the top side 650 of the chassis-less circuit board substrate 602. Again, the individual accelerator circuits 1020 and communication circuit 830 are mounted to the top side 650 of the chassis-less circuit board substrate 602 such that no two heat-producing, electrical components shadow each other as discussed above. The memory devices 720 of the accelerator sled 1000 are mounted to the bottom side 750 of the of the chassis-less circuit board substrate 602 as discussed above in regard to the sled 600. Although mounted to the bottom side 750, the memory devices 720 are communicatively coupled to the accelerator circuits 1020 located on the top side 650 via the I/O subsystem 622 (e.g., through vias). Further, each of the accelerator circuits 1020 may include a heatsink 1070 that is larger than a traditional heatsink used in a server. As discussed above with reference to the heatsinks 870, the heatsinks 1070 may be larger than traditional heatsinks because of the "free" area provided by the memory resources 720 being located on the bottom side 750 of the chassis-less circuit board substrate 602 rather than on the top side 650.

Figure 12:
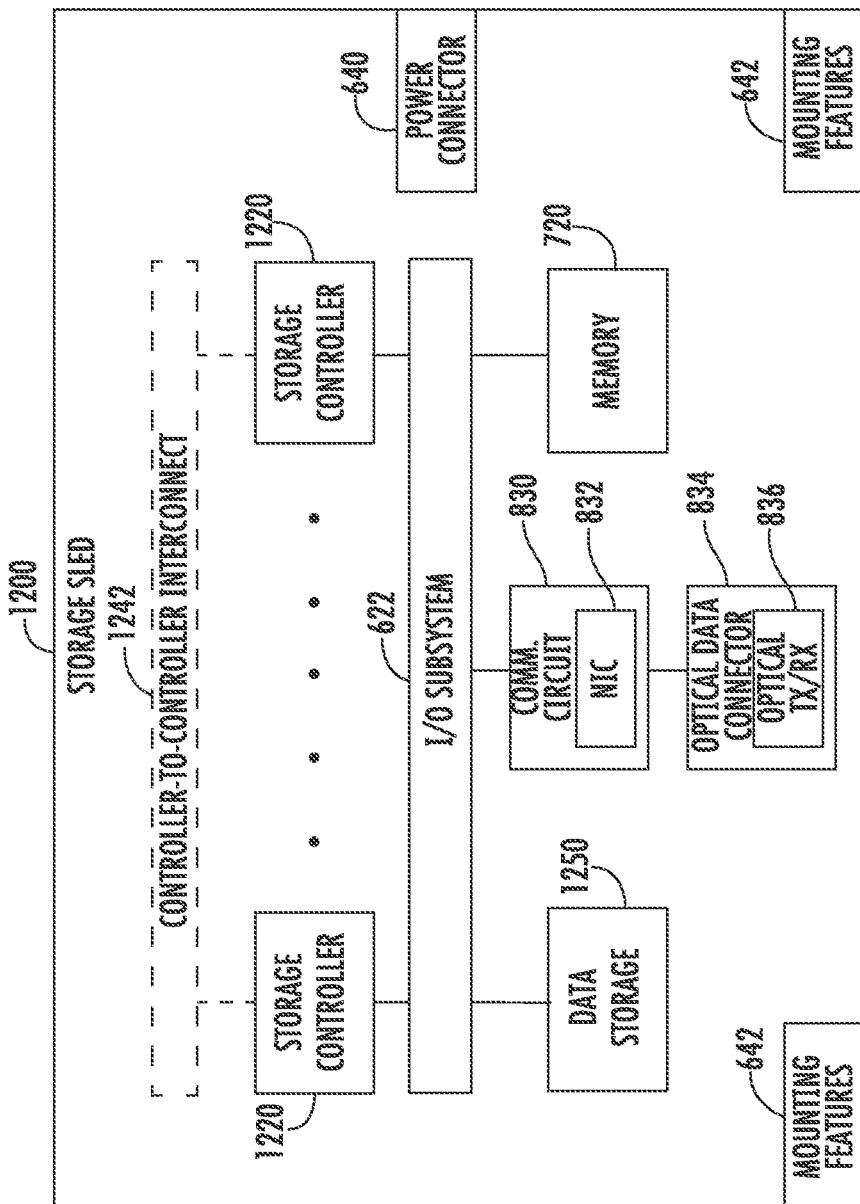
FIG. 12 is a simplified block diagram of at least one embodiment of a storage sled usable in a data center.

Referring now to FIG. 12, in some embodiments, the sled 400 may be embodied as a storage sled 1200. The storage sled 1200 is configured, to store data in a data storage 1250 local to the storage sled 1200. For example, during operation, a compute sled 800 or an accelerator sled 1000 may store and retrieve data from the data storage 1250 of the storage sled 1200. The storage sled 1200 includes various components similar to components of the sled 400 and/or the compute sled 800, which have been identified in FIG. 12 using the same reference numbers. The description of such components provided above with regard to FIGS. 6, 7, and 8 apply to the corresponding components of the storage sled 1200 and is not repeated herein for clarity of the description of the storage sled 1200.

In the illustrative storage sled 1200, the physical resources 620 are embodied as storage controllers 1220. Although only two storage controllers 1220 are shown in FIG. 12, it should be appreciated that the storage sled 1200 may include additional storage controllers 1220 in other embodiments. The storage controllers 1220 may be embodied as any type of processor, controller, or control circuit capable of controlling the storage and retrieval of data into the data storage 1250 based on requests received via the communication circuit 830. In the illustrative embodiment, the storage controllers 1220 are embodied as relatively low-power processors or controllers. For example, in some embodiments, the storage controllers 1220 may be configured to operate at a power rating of about 75 watts.

In some embodiments, the storage sled 1200 may also include a controller-to-controller interconnect 1242. Similar to the resource-to-resource interconnect 624 of the sled 400 discussed above, the controller-to-controller interconnect 1242 may be embodied as any type of communication interconnect capable of facilitating controller-to-controller communications. In the illustrative embodiment, the controller-to-controller interconnect 1242 is embodied as a high-speed point-to-point interconnect (e.g., faster than the I/O subsystem 622). For example, the controller-to-controller interconnect 1242 may be embodied as a QuickPath Interconnect (QPI), an UltraPath Interconnect (UPI), or other high-speed point-to-point interconnect dedicated to processor-to-processor communications.

Figure 13:
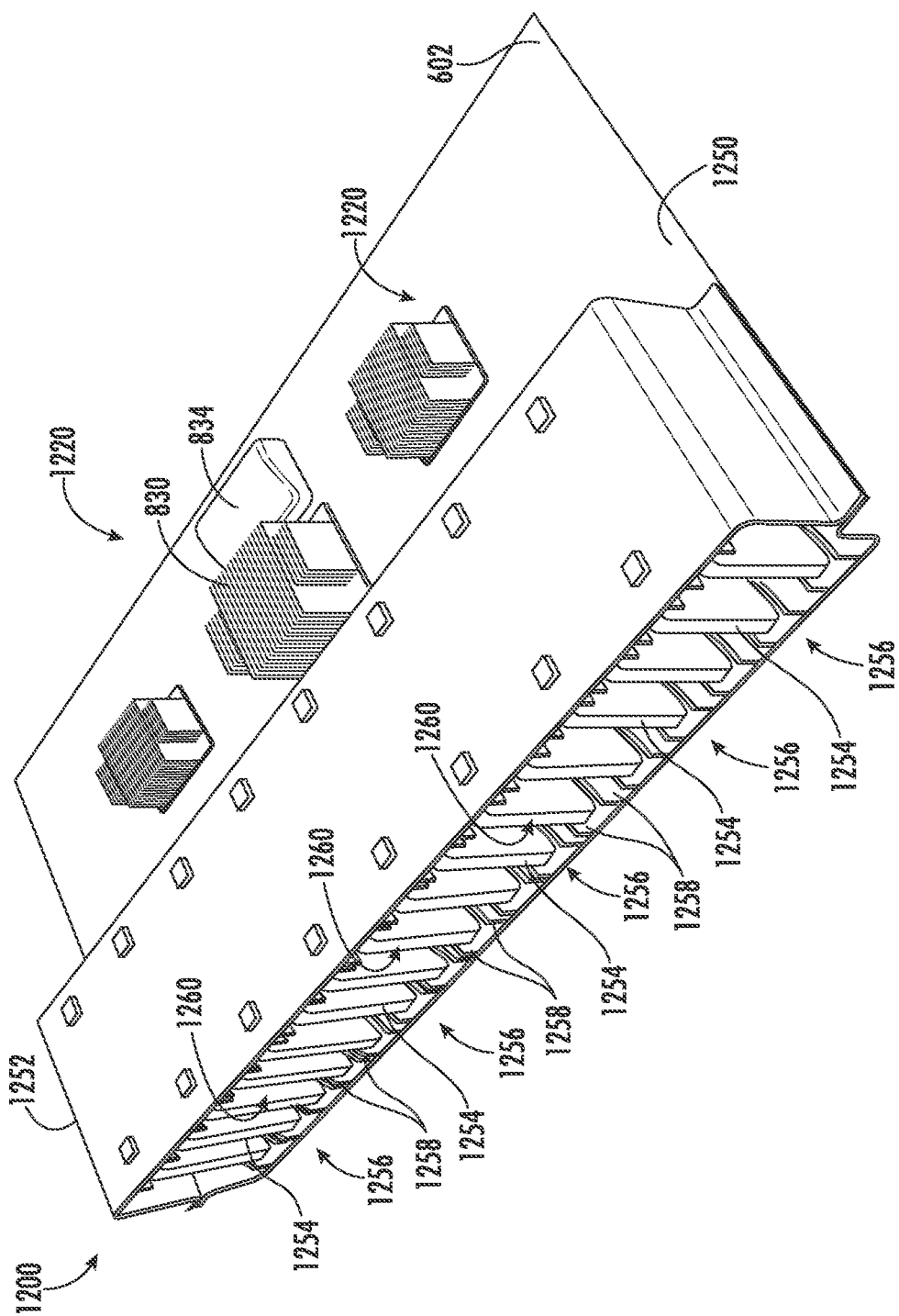
FIG. 13 is a top perspective view of at least one embodiment of a storage sled.

Referring now to FIG. 13, an illustrative embodiment of the storage sled 1200 is shown. In the illustrative embodiment, the data storage 1250 is embodied as, or otherwise includes, a storage cage 1252 configured to house one or more solid state drives (SSDs) 1254. To do so, the storage cage 1252 includes a number of mounting slots 1256, each of which is configured to receive a corresponding solid state drive 1254. Each of the mounting slots 1256 includes a number of drive guides 1258 that cooperate to define an access opening 1260 of the corresponding mounting slot 1256. The storage cage 1252 is secured to the chassis-less circuit board substrate 602 such that the access openings face away from (e.g., toward the front of) the chassis-less circuit board substrate 602. As such, solid state drives 1254 are accessible while the storage sled 1200 is mounted in a corresponding rack 204. For example, a solid state drive 1254 may be swapped out of a rack 240 (e.g., via a robot) while the storage sled 1200 remains mounted in the corresponding rack 240.

The storage cage 1252 illustratively includes sixteen mounting slots 1256 and is capable of mounting and storing sixteen solid state drives 1254. Of course, the storage cage 1252 may be configured to store additional or fewer solid state drives 1254 in other embodiments. Additionally, in the illustrative embodiment, the solid state drivers are mounted vertically in the storage cage 1252, but may be mounted in the storage cage 1252 in a different orientation in other embodiments. Each solid state drive 1254 may be embodied as any type of data storage device capable of storing long term data. To do so, the solid state drives 1254 may include volatile and non-volatile memory devices discussed above.

As shown in FIG. 13, the storage controllers 1220, the communication circuit 830, and the optical data connector 834 are illustratively mounted to the top side 650 of the chassis-less circuit board substrate 602. Again, as discussed above, any suitable attachment or mounting technology may be used to mount the electrical components of the storage sled 1200 to the chassis-less circuit board substrate 602 including, for example, sockets (e.g., a processor socket), holders, brackets, soldered connections, and/or other mounting or securing techniques.

As discussed above, the individual storage controllers 1220 and the communication circuit 830 are mounted to the top side 650 of the chassis-less circuit board substrate 602 such that no two heat-producing, electrical components shadow each other. For example, the storage controllers 1220 and the communication circuit 830 are mounted in corresponding locations on the top side 650 of the chassis-less circuit board substrate 602 such that no two of those electrical components are linearly in-line with each other along the direction of the airflow path 608.

The memory devices 720 of the storage sled 1200 are mounted to the bottom side 750 of the of the chassis-less circuit board substrate 602 as discussed above in regard to the sled 400. Although mounted to the bottom side 750, the memory devices 720 are communicatively coupled to the storage controllers 1220 located on the top side 650 via the I/O subsystem 622. Again, because the chassis-less circuit board substrate 602 is embodied as a double-sided circuit board, the memory devices 720 and the storage controllers 1220 may be communicatively coupled by one or more vias, connectors, or other mechanisms extending through the chassis-less circuit board substrate 602. Each of the storage controllers 1220 includes a heatsink 1270 secured thereto. As discussed above, due to the improved thermal cooling characteristics of the chassis-less circuit board substrate 602 of the storage sled 1200, none of the heatsinks 1270 include cooling fans attached thereto. That is, each of the heatsinks 1270 is embodied as a fan-less heatsink.

Figure 14:
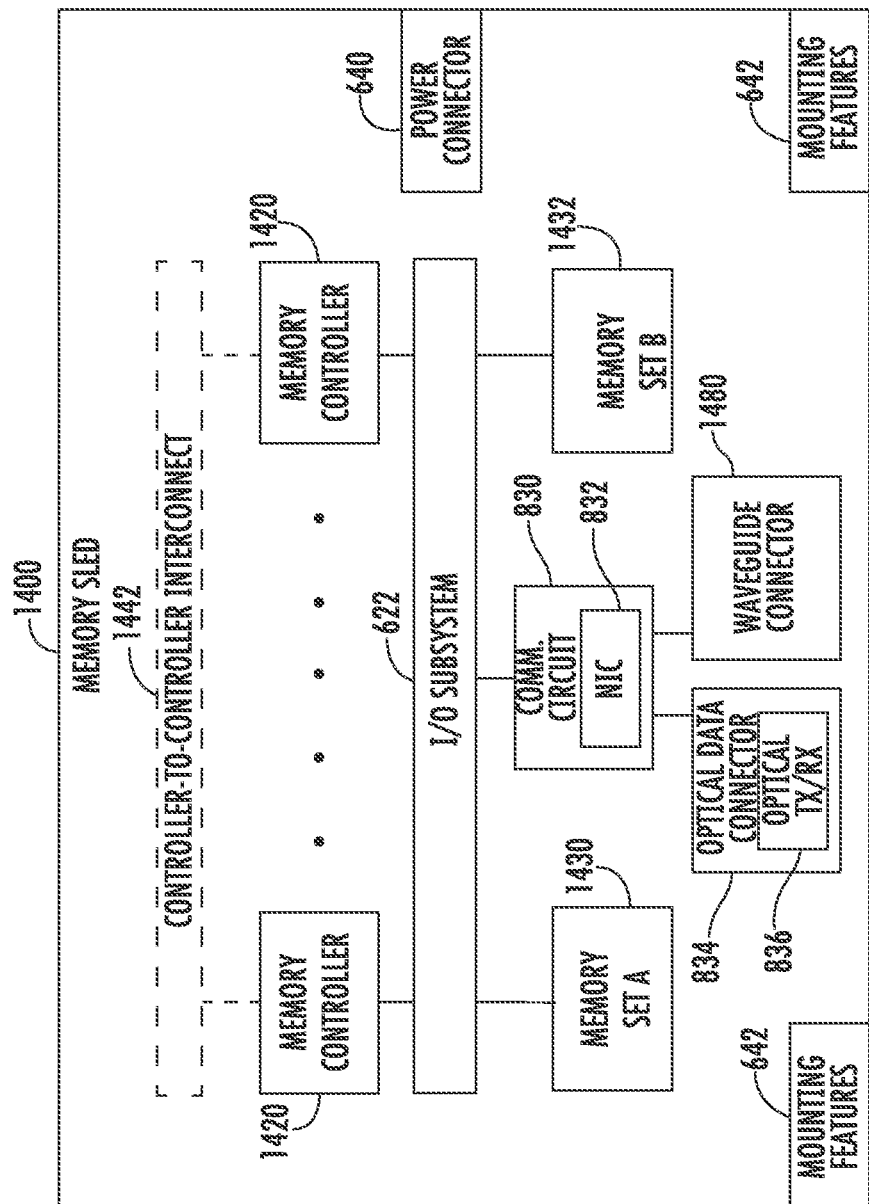
FIG. 14 is a simplified block diagram of at least one embodiment of a memory sled usable in a data center.

Referring now to FIG. 14, in some embodiments, the sled 400 may be embodied as a memory sled 1400. The storage sled 1400 is optimized, or otherwise configured, to provide other sleds 400 (e.g., compute sleds 800, accelerator sleds 1000, etc.) with access to a pool of memory (e.g., in two or more sets 1430, 1432 of memory devices 720) local to the memory sled 1200. For example, during operation, a compute sled 800 or an accelerator sled 1000 may remotely write to and/or read from one or more of the memory sets 1430, 1432 of the memory sled 1200 using a logical address space that maps to physical addresses in the memory sets 1430, 1432. The memory sled 1400 includes various components similar to components of the sled 400 and/or the compute sled 800, which have been identified in FIG. 14 using the same reference numbers. The description of such components provided above in regard to FIGS. 6, 7, and 8 apply to the corresponding components of the memory sled 1400 and is not repeated herein for clarity of the description of the memory sled 1400.

In the illustrative memory sled 1400, the physical resources 620 are embodied as memory controllers 1420. Although only two memory controllers 1420 are shown in FIG. 14, it should be appreciated that the memory sled 1400 may include additional memory controllers 1420 in other embodiments. The memory controllers 1420 may be embodied as any type of processor, controller, or control circuit capable of controlling the writing and reading of data into the memory sets 1430, 1432 based on requests received via the communication circuit 830. In the illustrative embodiment, each memory controller 1420 is connected to a corresponding memory set 1430, 1432 to write to and read from memory devices 720 within the corresponding memory set 1430, 1432 and enforce any permissions (e.g., read, write, etc.) associated with sled 400 that has sent a request to the memory sled 1400 to perform a memory access operation (e.g., read or write).

In some embodiments, the memory sled 1400 may also include a controller-to-controller interconnect 1442. Similar to the resource-to-resource interconnect 624 of the sled 400 discussed above, the controller-to-controller interconnect 1442 may be embodied as any type of communication interconnect capable of facilitating controller-to-controller communications. In the illustrative embodiment, the controller-to-controller interconnect 1442 is embodied as a high-speed point-to-point interconnect (e.g., faster than the I/O subsystem 622). For example, the controller-to-controller interconnect 1442 may be embodied as a QuickPath Interconnect (QPI), an UltraPath Interconnect (UPI), or other high-speed point-to-point interconnect dedicated to processor-to-processor communications. As such, in some embodiments, a memory controller 1420 may access, through the controller-to-controller interconnect 1442, memory that is within the memory set 1432 associated with another memory controller 1420. In some embodiments, a scalable memory controller is made of multiple smaller memory controllers, referred to herein as "chiplets", on a memory sled (e.g., the memory sled 1400). The chiplets may be interconnected (e.g., using EMIB (Embedded Multi-Die Interconnect Bridge)). The combined chiplet memory controller may scale up to a relatively large number of memory controllers and I/O ports, (e.g., up to 16 memory channels). In some embodiments, the memory controllers 1420 may implement a memory interleave (e.g., one memory address is mapped to the memory set 1430, the next memory address is mapped to the memory set 1432, and the third address is mapped to the memory set 1430, etc.). The interleaving may be managed within the memory controllers 1420, or from CPU sockets (e.g., of the compute sled 800) across network links to the memory sets 1430, 1432, and may improve the latency associated with performing memory access operations as compared to accessing contiguous memory addresses from the same memory device.

Further, in some embodiments, the memory sled 1400 may be connected to one or more other sleds 400 (e.g., in the same rack 240 or an adjacent rack 240) through a waveguide, using the waveguide connector 1480. In the illustrative embodiment, the waveguides are 64 millimeter waveguides that provide 16 Rx (e.g., receive) lanes and 16 Tx (e.g., transmit) lanes. Each lane, in the illustrative embodiment, is either 16 GHz or 32 GHz. In other embodiments, the frequencies may be different. Using a waveguide may provide high throughput access to the memory pool (e.g., the memory sets 1430, 1432) to another sled (e.g., a sled 400 in the same rack 240 or an adjacent rack 240 as the memory sled 1400) without adding to the load on the optical data connector 834.

Figure 15:
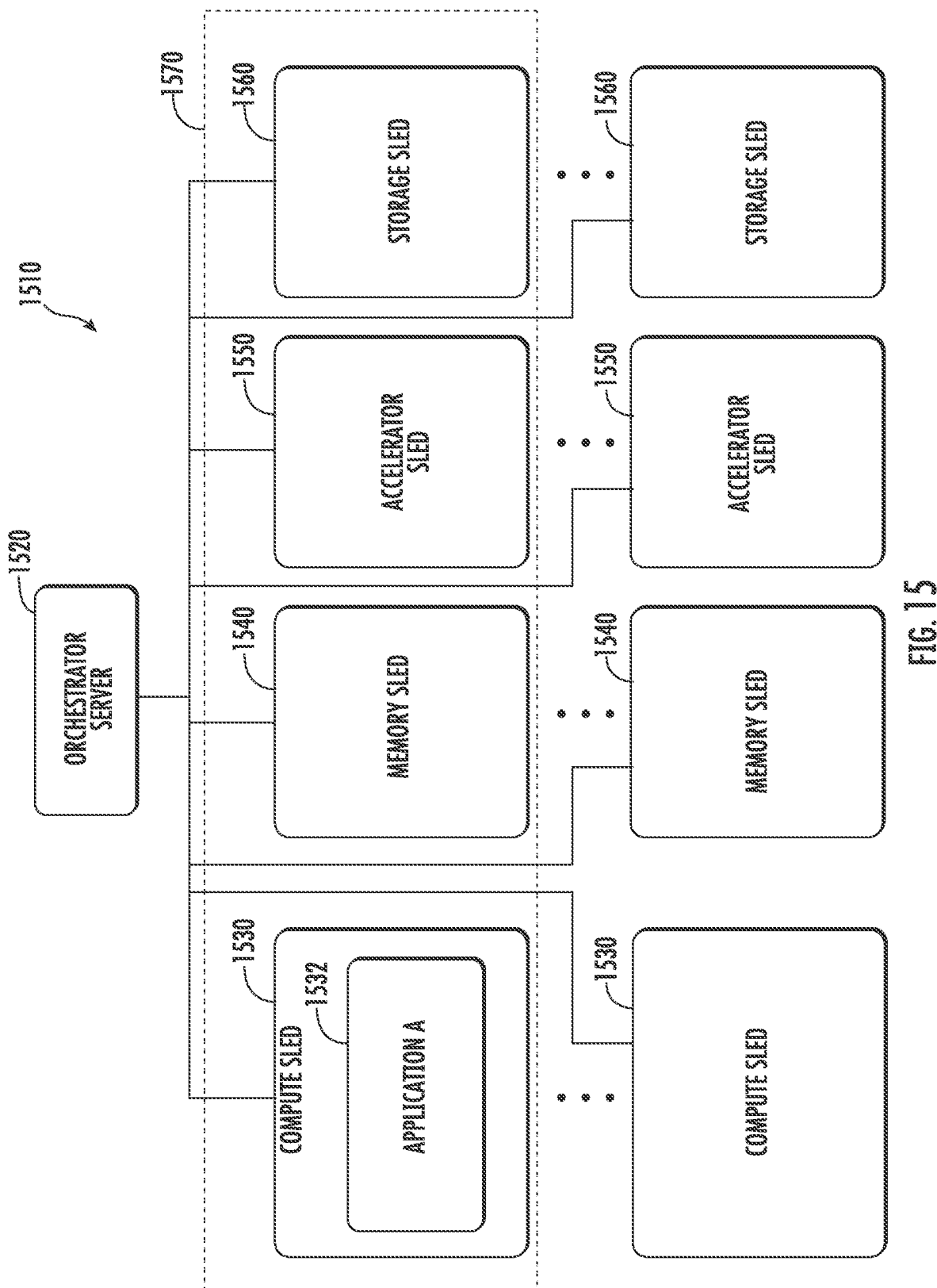
FIG. 15 depicts a system.

Referring now to FIG. 15, a system for executing one or more workloads (e.g., applications) may be implemented in accordance with the data center 100. In the illustrative embodiment, the system 1510 includes an orchestrator server 1520, which may be embodied as a managed node comprising a compute device (e.g., a processor 820 on a compute sled 800) executing management software (e.g., a cloud operating environment, such as OpenStack) that is communicatively coupled to multiple sleds 400 including a large number of compute sleds 1530 (e.g., each similar to the compute sled 800), memory sleds 1540 (e.g., each similar to the memory sled 1400), accelerator sleds 1550 (e.g., each similar to the memory sled 1000), and storage sleds 1560 (e.g., each similar to the storage sled 1200). One or more of the sleds 1530, 1540, 1550, 1560 may be grouped into a managed node 1570, such as by the orchestrator server 1520, to collectively perform a workload (e.g., an application 1532 executed in a virtual machine or in a container). The managed node 1570 may be embodied as an assembly of physical resources 620, such as processors 820, memory resources 720, accelerator circuits 1020, or data storage 1250, from the same or different sleds 400. Further, the managed node may be established, defined, or "spun up" by the orchestrator server 1520 at the time a workload is to be assigned to the managed node or at any other time, and may exist regardless of whether any workloads are presently assigned to the managed node. In the illustrative embodiment, the orchestrator server 1520 may selectively allocate and/or deallocate physical resources 620 from the sleds 400 and/or add or remove one or more sleds 400 from the managed node 1570 as a function of quality of service (QOS) targets (e.g., a target throughput, a target latency, a target number instructions per second, etc.) associated with a service level agreement for the workload (e.g., the application 1532). In doing so, the orchestrator server 1520 may receive telemetry data indicative of performance conditions (e.g., throughput, latency, instructions per second, etc.) in each sled 400 of the managed node 1570 and compare the telemetry data to the quality of service targets to determine whether the quality of service targets are being satisfied. The orchestrator server 1520 may additionally determine whether one or more physical resources may be deallocated from the managed node 1570 while still satisfying the QoS targets, thereby freeing up those physical resources for use in another managed node (e.g., to execute a different workload). Alternatively, if the QoS targets are not presently satisfied, the orchestrator server 1520 may determine to dynamically allocate additional physical resources to assist in the execution of the workload (e.g., the application 1532) while the workload is executing. Similarly, the orchestrator server 1520 may determine to dynamically deallocate physical resources from a managed node if the orchestrator server 1520 determines that deallocating the physical resource would result in QoS targets still being met.

Additionally, in some embodiments, the orchestrator server 1520 may identify trends in the resource utilization of the workload (e.g., the application 1532), such as by identifying phases of execution (e.g., time periods in which different operations, each having different resource utilizations characteristics, are performed) of the workload (e.g., the application 1532) and pre-emptively identifying available resources in the data center 100 and allocating them to the managed node 1570 (e.g., within a predefined time period of the associated phase beginning). In some embodiments, the orchestrator server 1520 may model performance based on various latencies and a distribution scheme to place workloads among compute sleds and other resources (e.g., accelerator sleds, memory sleds, storage sleds) in the data center 100. For example, the orchestrator server 1520 may utilize a model that accounts for the performance of resources on the sleds 400 (e.g., FPGA performance, memory access latency, etc.) and the performance (e.g., congestion, latency, bandwidth) of the path through the network to the resource (e.g., FPGA). As such, the orchestrator server 1520 may determine which resource(s) should be used with which workloads based on the total latency associated with each potential resource available in the data center 100 (e.g., the latency associated with the performance of the resource itself in addition to the latency associated with the path through the network between the compute sled executing the workload and the sled 400 on which the resource is located).

In some embodiments, the orchestrator server 1520 may generate a map of heat generation in the data center 100 using telemetry data (e.g., temperatures, fan speeds, etc.) reported from the sleds 400 and allocate resources to managed nodes as a function of the map of heat generation and predicted heat generation associated with different workloads, to maintain a target temperature and heat distribution in the data center 100. Additionally or alternatively, in some embodiments, the orchestrator server 1520 may organize received telemetry data into a hierarchical model that is indicative of a relationship between the managed nodes (e.g., a spatial relationship such as the physical locations of the resources of the managed nodes within the data center 100 and/or a functional relationship, such as groupings of the managed nodes by the customers the managed nodes provide services for, the types of functions typically performed by the managed nodes, managed nodes that typically share or exchange workloads among each other, etc.). Based on differences in the physical locations and resources in the managed nodes, a given workload may exhibit different resource utilizations (e.g., cause a different internal temperature, use a different percentage of processor or memory capacity) across the resources of different managed nodes. The orchestrator server 1520 may determine the differences based on the telemetry data stored in the hierarchical model and factor the differences into a prediction of future resource utilization of a workload if the workload is reassigned from one managed node to another managed node, to accurately balance resource utilization in the data center 100. In some embodiments, the orchestrator server 1520 may identify patterns in resource utilization phases of the workloads and use the patterns to predict future resource utilization of the workloads.

To reduce the computational load on the orchestrator server 1520 and the data transfer load on the network, in some embodiments, the orchestrator server 1520 may send self-test information to the sleds 400 to enable each sled 400 to locally (e.g., on the sled 400) determine whether telemetry data generated by the sled 400 satisfies one or more conditions (e.g., an available capacity that satisfies a predefined threshold, a temperature that satisfies a predefined threshold, etc.). Each sled 400 may then report back a simplified result (e.g., yes or no) to the orchestrator server 1520, which the orchestrator server 1520 may utilize in determining the allocation of resources to managed nodes.

Figure 16:
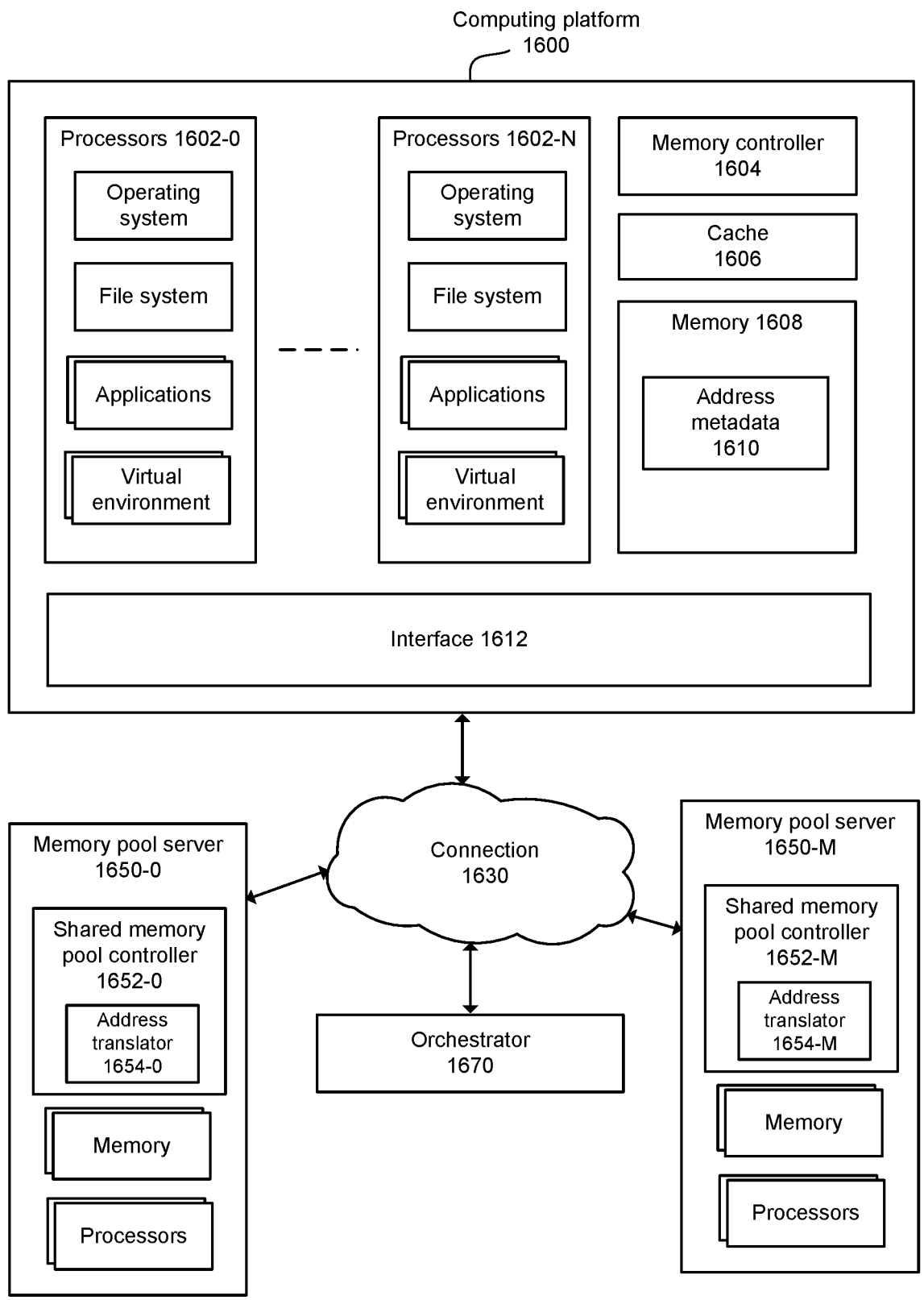
FIG. 16 depicts a computing system.

FIG. 16 depicts a computing platform 1600 that can access (e.g., read or write) content in memory pools 1650-0 to 1650-M using connection 1630. Note that memory pool 1650 can refer to any or all of memory pools 1650-0 to 1650-M. Computing platform 1600 can include or access processors 1602-0 to 1602-N, where N is an integer that 1 or greater, memory controller 1604, cache 1606, and memory 1608. In some examples, processors 1602-0 to 1602-N can include any central processing unit (CPU), core, graphics processing unit (GPU), field programmable gate array (FPGA), or application specific integrated circuit (ASIC). Processors 1602-0 to N can execute an operating system (OS), file system, applications or virtualized execution environments.

A virtualized execution environment can include at least a virtual machine or a container. A virtual machine (VM) can be software that runs an operating system and one or more applications. A VM can be defined by specification, configuration files, virtual disk file, non-volatile random access memory (NVRAM) setting file, and the log file and is backed by the physical resources of a host computing platform. A VM can be an OS or application environment that is installed on software, which imitates dedicated hardware. The end user has the same experience on a virtual machine as they would have on dedicated hardware. Specialized software, called a hypervisor, emulates the PC client or server's CPU, memory, hard disk, network and other hardware resources completely, enabling virtual machines to share the resources. The hypervisor can emulate multiple virtual hardware platforms that are isolated from each other, allowing virtual machines to run Linux® and Windows® Server operating systems on the same underlying physical host.

A container can be a software package of applications, configurations and dependencies so the applications run reliably on one computing environment to another. Containers can share an operating system installed on the server platform and run as isolated processes. A container can be a software package that contains everything the software needs to run such as system tools, libraries, and settings. Containers are not installed like traditional software programs, which allows them to be isolated from the other software and the operating system itself. The isolated nature of containers provides several benefits. First, the software in a container will run the same in different environments. For example, a container that includes PHP and MySQL can run identically on both a Linux computer and a Windows machine. Second, containers provide added security since the software will not affect the host operating system. While an installed application may alter system settings and modify resources, such as the Windows registry, a container can only modify settings within the container.

Any of processors 1602-0 to 1602-N can use memory controller 1604 to access content in cache 1606, memory 1608, or memory pool 1650. Cache 1606 can be dedicated to a processor or shared among processors. Cache 1606 can be any type of cache such as level 1, level 2, level 3, lower level cache (LLC), a volatile near memory accessible using any JEDEC double data rate (DDR) compatible memory and interface, or any type of non-volatile or persistent memory. Memory 1608 can be any type of volatile, non-volatile or persistent memory. Non-limiting examples of volatile, non-volatile and persistent memory are provided herein.

In some examples, memory controller 1604 can manage swapping of content stored in cache 1606, memory 1608 and any memory pool 1650. Memory controller 1604 can be embodied using hardware and/or processor-executed software. A hardware-controlled swap can provide no penalty of changing page tables and translation lookaside buffer (TLB) shootdown. Any core of a processor may use a TLB that stores translations of virtual memory pages to physical memory addresses. When a virtual memory page mapping is modified in a page table, or when a hypervisor unmaps or otherwise modifies a guest page from a virtual machine's virtual memory, the TLB for a processing core is updated accordingly. In some examples, an interrupt is used, known as a TLB shootdown interrupt, which instructs a targeted processor core to review a software-defined list of unmapped virtual memory page entries and to remove these entries from their respective TLB. The targeted processor cores may remove the unmapped entry from their respective TLB tables, and signal their completion to the initiating processor of the TLB shootdown.

In some embodiments, a software-controlled swap can be performed by any processor (e.g., an OS or driver) to manage content stored in cache 1606, memory 1608 and any memory pool 1650.

With reference to FIG. 17, memory controller 1604 can consider accesses metadata for various address and location identifier (tag) in determining whether to swap content from cache 1606 or memory 1608 to any memory pool 1650. For example, if content associated with multiple addresses are to be stored in a memory region and thereby share a memory region, the number of accesses of a particular address can be considered in determining whether to store the content in cache 1606 or memory 1608 or in memory pool 1650. Memory pool 1650 can provide a higher content access latency time than that of cache 1606 or memory 1608.

In some examples, memory controller 1604 can manage swapping and storage of content between cache 1606 and memory 1608, between cache 1606 and memory pool 1650 (whether a single or multiple servers), or between memory 1608 and memory pool 1650. In other words, any operations described with respect to managing content migration or memory allocation in cache 1606 and memory 1608 and any memory pool 1650 can take place among any of cache 1606, memory 1608, and memory pool 1650.

In some embodiments, memory pool 1650 is a server and is shared by multiple processors 1602-0 to 1602-N and memory 1608 be used as a cache for content in memories of memory pool 1650. In addition, or alternatively, cache 1606 can be used as a cache for content in memories of memory pool 1650.

For example, some addressable regions of memory 1608 can be used as local memory for processors 1602-0 to 1602-N and some addressable regions of memory 1608 can be used as a cache for either inclusive or exclusive caching of content in conjunction with a memory pool.

In some examples, any memory within memory pool 1650 can include any type of volatile or non-volatile memory. Types of memory include, but are not limited to, random-access memory (RAM), dynamic RAM (D-RAM), double data rate (DDR) SDRAM, SRAM, T-RAM or Z-RAM. One example of volatile memory includes DRAM, or some variant such as SDRAM. A memory subsystem as described herein may be compatible with a number of memory technologies, such as DDR4 (DDR version 4, initial specification published in September 2012 by JEDEC), LPDDR4 (LOW POWER DOUBLE DATA RATE (LPDDR) version 4, JESD209-4, originally published by JEDEC in August 2014), WIO2 (Wide I/O 2 (WideIO2), JESD229-2, originally published by JEDEC in August 2014), HBM (HIGH BANDWIDTH MEMORY DRAM, JESD235, originally published by JEDEC in October 2013), DDR5 (DDR version 5, currently in discussion by JEDEC), LPDDR5 (LPDDR version 5, currently in discussion by JEDEC), HBM2 (HBM version 2, currently in discussion by JEDEC), and/or others, and technologies based on derivatives or extensions of such specifications.

In some examples, memory may include non-volatile types of memory that is a block addressable, such as for NAND or NOR technologies. Thus, memory can also include a future generation of types of non-volatile memory, such as a 3-dimensional cross-point memory (3D XPoint™ commercially available from Intel Corporation), Samsung Z-NAND, or other byte addressable non-volatile types of memory. According to some examples, memory may include types of non-volatile memory that includes chalcogenide glass, multi-threshold level NAND flash memory, NOR flash memory, single or multi-level Phase Change Memory (PCM), a resistive memory, nanowire memory, FeTRAM, MRAM that incorporates memristor technology, or STT-MRAM, or a combination of any of the above, or other memory.

Various embodiments can use system main memory 1608 with at least two levels of memory ("2 LM") that includes cached subsets of system disk or SSD-level storage (in addition to, for example, run-time data). This main memory includes a first level (alternatively referred to herein as "near memory") including smaller faster memory made of, for example, DRAM or other volatile memory; and a second level (alternatively referred to herein as "far memory") which includes larger and slower (with respect to the near memory) volatile memory (e.g., DRAM) or nonvolatile memory storage (e.g., flash memory or byte addressable non-volatile memory (e.g., Intel Optane® or Samsung Z-NAND®)). The far memory is presented as "main memory" to the host operating system (OS), while the near memory is a cache for the far memory that is transparent to the OS, thus rendering the embodiments described below to appear the same as prior art main memory solutions. The management of the two-level memory may be done by a combination of logic and modules executed via the host central processing unit (CPU). Near memory may be coupled to the host system CPU via high bandwidth, low latency means for efficient processing. Far memory may be coupled to the CPU via low bandwidth, high latency means (as compared to that of the near memory).

For example, in accordance with some embodiments, cache 1606, memory 1608, and memory pool 1650 can be thinly provisioned so that memory space (e.g., addressable memory space) allocated to a processor for any use (e.g., a particular application, virtual environment or any other uses) is less than indicated to be allocated. In some examples, the memory allocated to a processor for a particular use is considered "thinly provisioned." In some examples, memory region are allocated in pool 1650 when content from cache 1606 is written from a cache (e.g., cache 1606 or memory 1608) to memory pool 1650 or swapped with other content in memory pool 1650. An example of a swapping operation is described herein.

Various embodiments provide for allocation of a region of cache 1606 or memory 1608 (e.g., cache line or other sized region) for use by content in one of multiple addressable memory regions and a code to identify whether content associated with an addressable memory region is stored in cache 1606 (or memory 1608) or in an addressable memory location of memory pool 1650-0 to 1650-M, where M is an integer. For example, a table described with respect to FIG. 17 can be used to associate a cache line address with a tag and access indicator. The table can be stored in cache 1606 or memory 1608 as metadata.

Turning to FIG. 17, a tag can identify a code that indicates a location of an address in cache 1606 or memory 1608 or in shared pooled memory 1650, whether the cache line has been written-to (written), whether content of the cache line is valid, and an access indicator. Direct mapped caching can be used whereby content associated with address ranges map to the same set. Accesses indicator can indicate an amount of times that content associated with an address in cache has been accessed (e.g., read-from or written-to) over a period of time. In other words, a hotness or coldness of data in the cache can be measured by the accesses indictor and, as described herein, can be used for eviction or swapping of data to cache 1606, memory 1608, or in shared pooled memory 1650. More frequently accessed data are generally stored in cache 1606 or memory 1608 to reduce latency of data access.

In some examples, if a 2-bit location code is used, content from at most one three specific addresses could reside in a cache line location in cache 1606 or memory 1608. For example, if a 2-bit location code is used and content of three address memory locations A, B, and C can be stored in a particular region of cache 1606 or memory 1608, then a code 00 can indicate that content starting at a memory location (e.g., A) is stored in cache 1606 or memory 1608, a code 01 can indicate that content starting at a memory location (e.g., B or C) is stored in memory pool 1650, and a code 10 can indicate that content starting at a memory location (e.g., C or B) is stored in memory pool 1650.

If a cache line (e.g., 64 bytes) is shared by content starting at addresses A, B, and C and the cache line is occupied by content from address A but a processor requests content from address B, a swapping operation can take place. For example, memory controller 1604 performs a swapping operation to cause the content from address A to be evicted from cache 1606 or memory 1608 and, if modified, written to a memory address in memory pool 1650. Content from address B can be read from memory pool 1650 and written to the cache line of cache 1606. Other granularities or sizes can be used other than 64 bytes such as 128 bytes, 256 bytes or other multiples of 64 bytes.

In some embodiments, memory controller 1604 can be configured to provide thin provisioning by applying either inclusive or exclusive cache configurations of content in cache 1606, memory 1608, and any backups in memory pool 1650. An inclusive cache configuration can include an entry in a cache also being stored in a memory pool 1650. An exclusive cache configuration can provide an entry in either a cache or in a memory pool 1650 but not both.

Memory pool 1650 can provide selective access to memory in the form of dual in-line memory modules (DIMMs). DIMMs may include various types of memory including volatile or non-volatile types of memory. For example, in a server, Registered DIMM (RDIMM) can be used and provide for buffering command address, control and clock before providing the signals to the memory devices. Load-Reduced DIMM (LRDIMM) use a buffer for data bus also in order to deal with loading of many ranks of memory devices. Unregistered DIMM (UDIMMs) are unbuffered DIMMs that do not have separate buffer before command address or data and communication can occur directly with memory devices. Other types of memory devices can be used. Note that memory pool 1650 need not be a single node but can be a group of distributed memory pools where a composite memory pool is formed from memory regions of different and disaggregated memory devices connected to the interface 1612. For example, memory pools can be formed using hyperconverged infrastructure (HCI) servers or in a group of one or more servers representing a shared, distributed memory pool.

Shared memory pool controller 1652 can be configured to provide memory accesses (e.g., read or writes) to memory devices in memory pool 1652. In some embodiments, shared memory pool controller 1652 can use an address translator 1654 to translate an address received from a particular processor and a location code to a physical memory address in a memory of pool 1650. For example, if processors 1602-0 and 1602-1 both provide the same physical memory address D and a location code, address translator 1654 can translate the address D from processor 1602-0 to a physical address and the address D from processor 1602-1 to another physical address.

Orchestrator system 1670 communicatively coupled to memory pool 1650 can configure address translator 1654 of any memory pool 1650 to associate an address provided by a particular CPU and location code with a physical address in a memory device. When a CPU issues a memory transaction to memory pool 1650, it also provides a CPU identifier and location code so that if multiple CPUs provide the same address, address translator 1654 can identify the correct physical address to use to complete a memory transaction from a CPU. In some examples, address translator 1654 can be implemented as part of computing platform 1600 and can issue physical address translations to any memory pool server 1650. Note that any reference to CPU can refer to any type of processor.

Note that processors can be added or removed from sharing any memory pool 1650. And more than one DDR memory channel can be provided per processor and per memory pool 1650.

Memory pool 1650 can also include one or more of: storage (non-volatile memory) pool, accelerators, processor-executed software, neural engine, any device, as well as other examples provided herein, and so forth. For example, memory pool 1650 can provide processors that provide capabilities described herein. For example, processors can provide compression (DC) capability, cryptography services such as public key encryption (PKE), cipher, hash/authentication capabilities, decryption, or other capabilities or services. In some embodiments, in addition or alternatively, target computing platform 150 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Target computing platform 150 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models. Processors can perform compute near memory to process data local to the storage of the data and providing processed data or results to a remote or local memory or processor.

Connection 1630 can be provide communications compatible or compliant with one or more of: Ethernet (IEEE 802.3), remote direct memory access (RDMA), InfiniBand, Internet Wide Area RDMA Protocol (iWARP), quick UDP Internet Connections (QUIC), RDMA over Converged Ethernet (ROCE), Peripheral Component Interconnect (PCIe), memory-mapped I/O (MMIO) read/MMIO write, Intel QuickPath Interconnect (QPI), Intel Ultra Path Interconnect (UPI), Intel On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, any specification with load-store semantics, and variations thereof. Data can be copied or stored to virtualized storage nodes using a protocol such as NVMe over Fabrics (NVMe-oF) or NVMe. Connection 1630 can include switches, routers, buses, interconnects, use the Internet or a private network.

In some examples, data movers (e.g., direct memory access (DMA) engine) that perform direct copies or writes can be used by any processor to copy content among cache 1606, memory 1608, and memory pool 1650 and perform load/store operations.

Computing platform 1600 and memory pool servers 1650 can transmit and receive commands using encrypted communications for security and access control. Orchestrator 1670 can manage keys used for encryption and decryption for a transmission and receipt.

Figure 18:
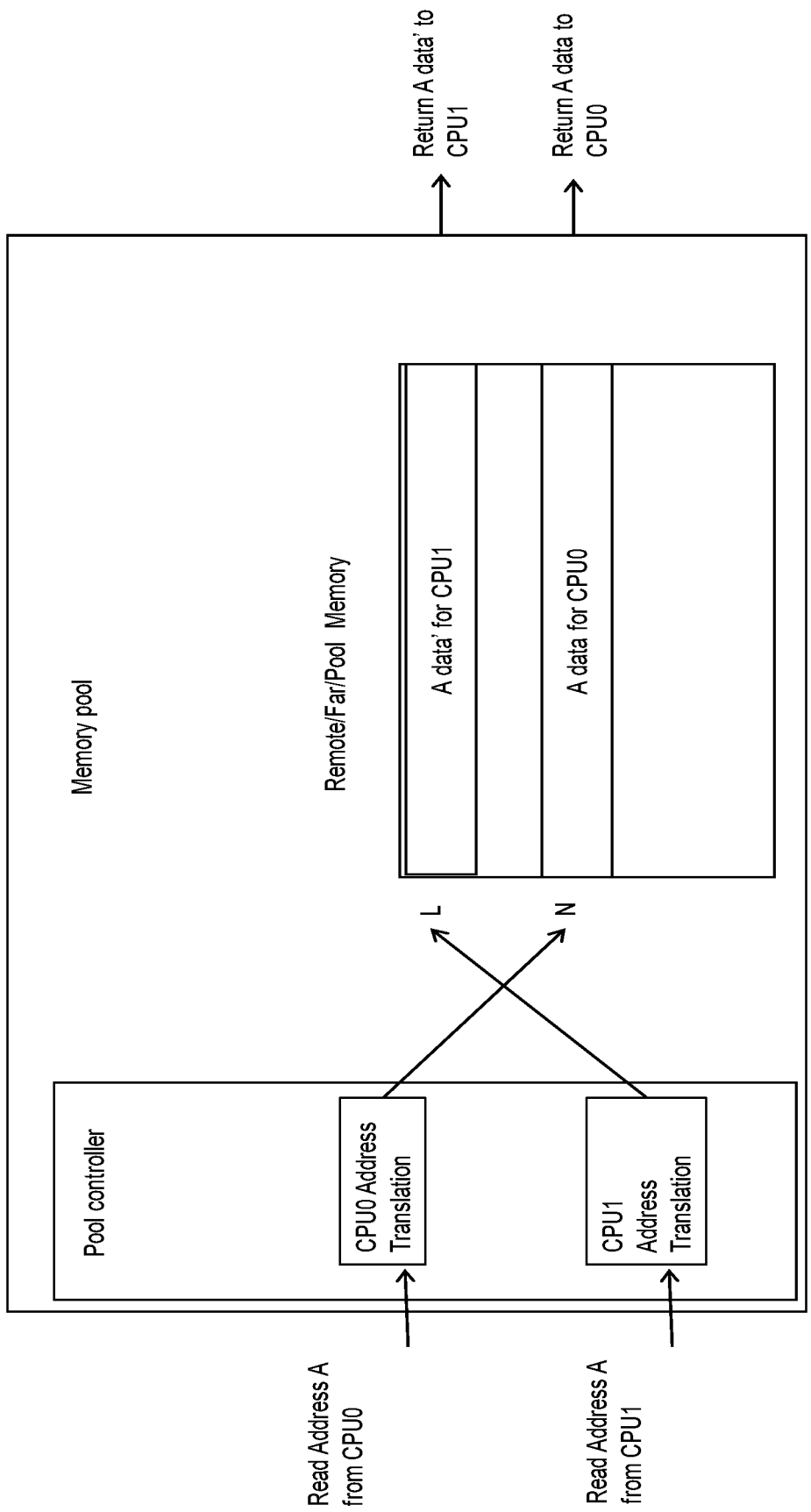
FIG. 18 depicts an example of an address translation.

FIG. 18 depicts an example of an address translation to distinguish a same address value from different processors. Address translation can be performed at least by a computing platform, processor, or a memory pool controller. In this example, a memory pool controller associated with issued memory transactions to memory devices (e.g., DIMMs) can apply address translation for addresses received from CPUs that share use of the memory devices in the memory pool. An orchestrator system can configure address translation of an address from a particular CPU to a physical address in a memory device in the pool so that a same address from different CPUs map to unique addresses in pool. For example, an address A from CPUs0 and 1 can be mapped to addresses L and N that do not overlap. In this example, for a read access where CPU0 and CPU1 provide a same address A, pool controller provides different physical addresses for data retrieval. Addresses can be allocated across multiple channels in a pool server or multiple pool servers. In some examples, address are allocated or provisioned in memory pool in response to a write operation.

For example, a 1 TB sized memory pool with 1 GB block size can be divided into 1024 blocks. In some examples, a particular CPU can have an associated table of address entries of the number of blocks (e.g., 1024) that are mapped to physical addresses in a memory pool. Other numbers of entries can be used.

In some examples, the address translation of an address can be on the same device or microchip as that used to provide connectivity of a computing system to the memory devices of the memory pool to reduce potential of locking if multiple CPUs request address translation at the same time.

An encryption scheme can be used to decrypt memory transactions received from any CPU using a specified decryption scheme. For any CPU and address pair that are identified as permitted to access a pool, a physical address in the pool can be identified. For example, the following table represents a possible configuration that can be used by a pool controller to determine a decryption scheme to use on a memory transaction, whether a CPU and its associated address can access a memory pool, and what address in the memory pool to use for the memory transaction.

| CPU identifier | Received Address | Permission to access pool | Encryption scheme | Converted address in pool |
|---|---|---|---|---|
| 0 | 0X00 FF0A | Yes | | 0X00 0000 |
| 0 | 0X00 1111 | No | | |
| 1 | 0X00 1111 | Yes | | 0X00 1F00 |
| ... | ... | ... | ... | ... |
| X-1 | 0X00 FF0A | Yes | | 0X00 1100 |
| X | 0X00 FF0A | Yes | | 0X00 1111 |

Figure 19:
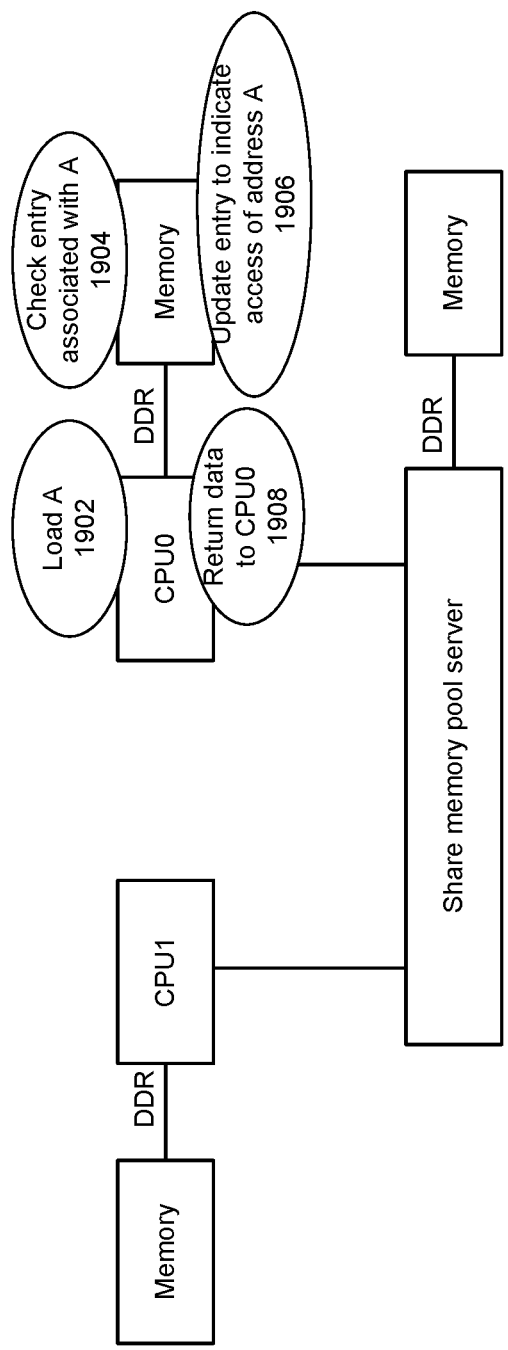
FIG. 19 depicts an example operation.

FIG. 19 depicts an example operation. In this example, data requested for address A is stored in local DDR-connected memory. This example illustrates use of an entry associated with address A from CPU0 to determine a location of data and update access indicator (hot/cold indicator). At 1902, CPU0 requests content associated with address A (Load "A" to a register). At 1904, a metadata entry is checked to determine whether data for address A is Valid and whether data is stored in the DDR-connected memory (cache). At 1906, an update of an access indicator (e.g., hot/cold indicator) for address A of CPU0 is made to indicate the address A was accessed (e.g., became hotter) because of a recent access. At 1908, data is provided from DDR-connected memory to CPU0. Operation of CPU1 with respect to shared memory pool server can follow a similar sequence for data stored in memory.

Figure 20:
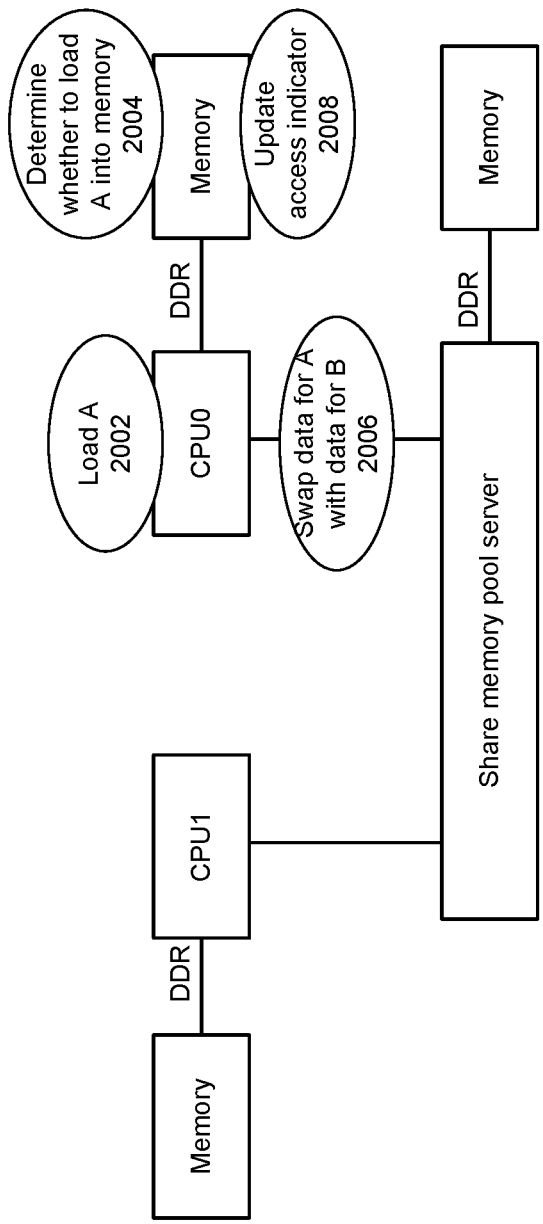
FIG. 20 depicts an example operation.

FIG. 20 depicts an example operation. In this example, data requested for address A is not stored in local DDR-connected memory but in a memory pool. At 2002, CPU0 issues a request for content starting with address A into a local register (Load addr:A Local Register). At 2004, a tag is checked to determine whether data for address A is Valid and whether data is stored in the DDR-connected memory (cache) or in a memory pool. In this example, data for addresses A and B share a cache line address or slot. Data for address B is currently in DDR cache, is Valid and has been written-to. The access indicator for addresses A and B are inspected and address A has more accesses than address B. Accordingly, data for address B is sent to memory pool and data for address A is copied to memory. In some cases, data for address A may be accessed from a shared memory pool and not retrieved to the memory if the data for address A is determined to be accessed less than data for address B.

At 2006, a swap of data at addresses A and B commences whereby data for address A is retrieved from the memory pool and data for address B is copied from memory to the memory pool. Note that data for address B can be stored at an address in memory pool configured by an orchestrator. To access data for address A from the memory pool, CPU0 provides an address, CPU0 identifier, and location identifier to the memory pool to identify the physical address in which to retrieve the data. Likewise, to store data for address B in the memory pool, CPU0 provides an address, CPU0 identifier, and location identifier to the memory pool to identify the physical address in which to store the data. At 2008, an update of an access indicator is made to both address A to indicate that address A was accessed recently. Operation of CPU1 with respect to shared memory pool server can follow a similar sequence for data stored in memory.

Figure 21:
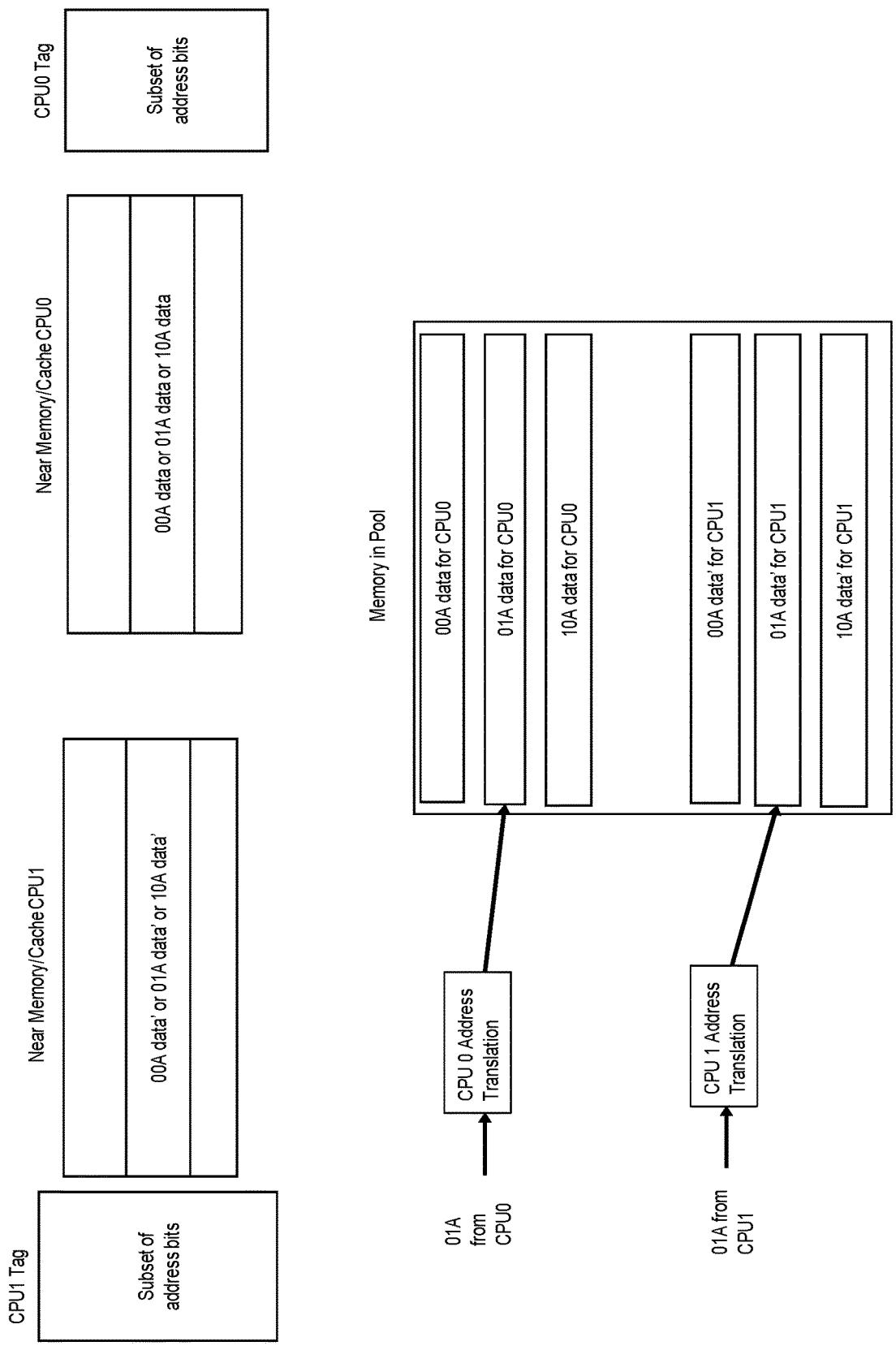
FIG. 21 depicts an example of a content access where content is stored in cache and
also in the memory pool.

FIG. 21 depicts an example of a content access where content is stored in cache and also in the memory pool. In other words, an example of a content access for an inclusive case is shown where an entry in cache is also stored in the memory pool. In this example, a 2-bit location tag is used and content stored in an address associated with a cache or near memory has a copy in one of three different addresses in the memory pool. In some examples, for an access to the memory pool, the tag can be provided with an address along with a CPU identifier to a memory pool to identify which of three memory addresses in a memory pool that content is stored to. In some examples, when or after content is written to the cache, the content is also copied in the memory pool. For a write of content to the cache or memory, a corresponding write of the content occurs in a pooled memory. Reads of content from cache or memory do not have to be written to the memory pool. Swapping of content from near memory/cache to memory pool can be performed based to copy more frequently accessed content to memory/cache and move less frequently accessed content to the memory pool.

In this example, for CPU0, tag values of 00, 01, and 10 are used to differentiate storage locations for address A, so that when a pool controller applies address translation of address A from CPU0, the address A can be differentiated as one of three addresses in pool memory. Similarly, in this example, for CPU1, tag values of 00, 01, and 10 are used to differentiate storage locations for address A, so that when pool controller applies address translation of address A from CPU1, the address A can be differentiated among three physical addresses in pool memory. Other sizes of location tags can be used to identify more possible locations to store content.

Figure 22:
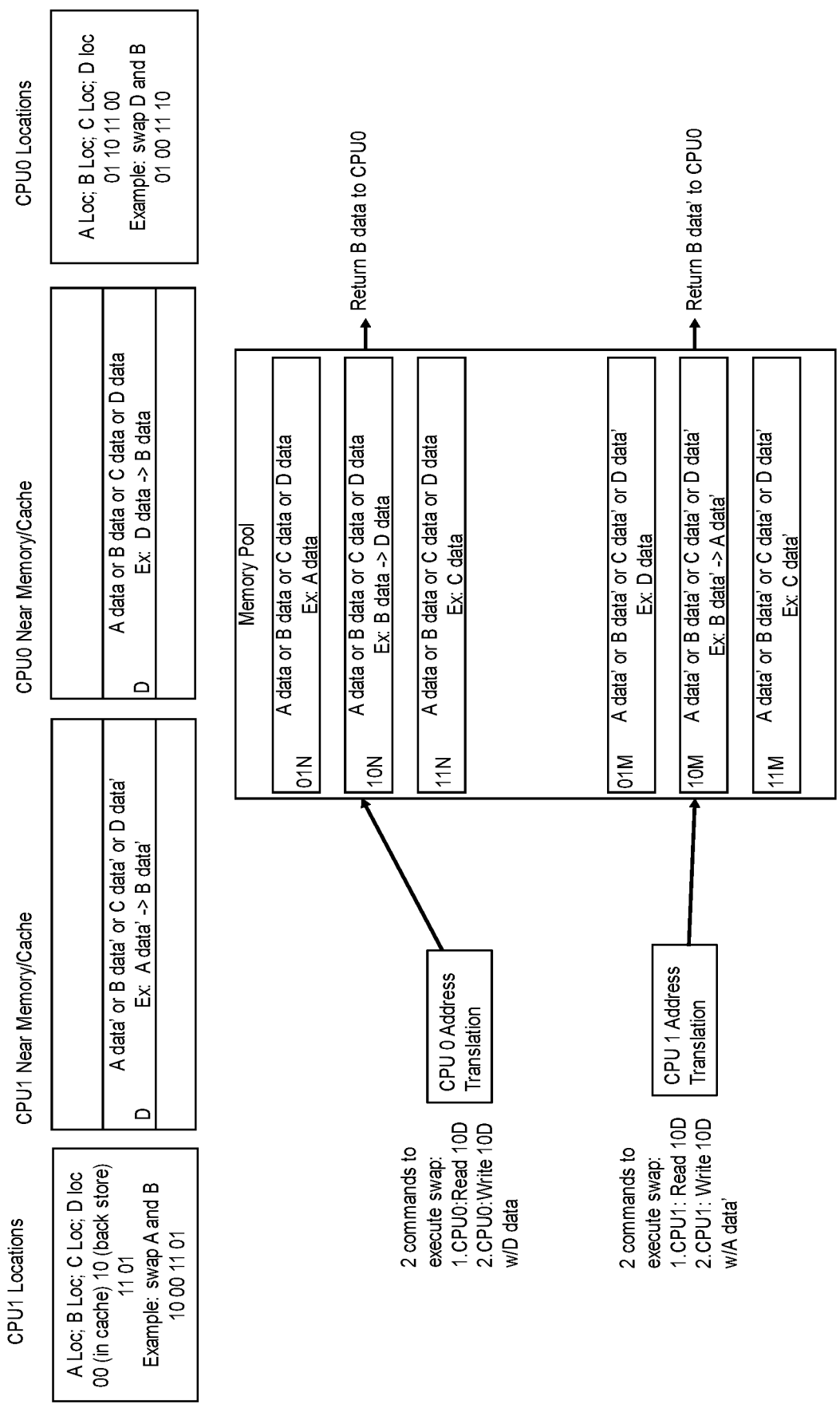
FIG. 22 depicts an example of use of memory or cache and a memory pool to store a copy of content.

FIG. 22 depicts an example of use of memory or cache and a memory pool to store a copy of content. In other words, an example of a content access for an exclusive case is shown where an entry is either stored in the cache/memory or memory pool. A location tag can be used to identify whether content is stored in the cache/memory or memory pool. In some examples, for accesses to the memory pool, the tag can be provided with an address along with a CPU identifier to a memory pool to identify which of three memory addresses in a memory pool that content is stored-in. If the tag identifies the data is in the memory pool and the accesses of the data is sufficiently high, then a swap is performed to copy requested data to the cache address and to copy data in the cache associated with the cache address to a corresponding address in the memory pool.

In this example, for CPU0, tag values of 00, 01, 10, and 11 are used to differentiate storage locations for address A, so that the address A can be differentiated as having content in the cache/memory or one of three addresses in a pool memory. Similarly, in this example, for CPU1, tag values of 00, 01, 10, and 11 are used to differentiate storage locations for address A, so that content of address A can be differentiated as in the cache/memory or as one of three addresses in pool memory. For both cases, a tag value of 00 identifies an address as being associated with a cache so that content associated with address A from CPU0 is stored in the cache or content associated with address A from CPU1 is stored in the cache, but at a different location from that used by CPU0. In some examples, the tag can be a subset of address bits of a memory address, such as most significant 2 bits. Other sizes of location tags can be used to identify more possible locations to store content.

In this example, a particular address in a cache is shared by addresses identified as A, B, C, and D. Initially, content associated with location A has a tag of 00 and is stored in cache; content associated with location B has a tag of 10 and is stored in the memory pool; content associated with location C has a tag of 11 and is stored in the memory pool but starting at a different address from that of B or D; and content associated with location D has a tag of 01 and is stored in the memory pool but starting at a different address from that of B or C.

CPU0 requests content starting at address B but content starting at address D is currently in a cache associated with address D. At least because content associated with address D is accessed less than content associated with address B, content associated with address D is copied from the cache to the memory pool at address B and the tags for addresses D and B are swapped so that the tag of B (10) is used to identify one of three locations to store content associated with address D from the cache and the tag of B is updated to 00 indicate that the data associated with address B is in the cache. Note that in this example, tags for locations A and C are respectively 01 and 11 to indicate storage of content for different locations in the memory pool.

To swap content associated with addresses B and D, CPU0 provides a request to read address N with a tag of 10 to read content of address B from the memory pool to differentiate that location 10 is to be used to read content from the memory pool. CPU0 next provides a request to write content to address N with tag of 10 to the memory pool with content from the cache associated with address D. Contents of address B are provided to the cache for CPU0 associated with address D to overwrite content associated with address D. A pool controller can use address translation to determine a physical address to use in memory pool to access contents of address N with tag of 10 from CPU0. Here the use of data and data' are to different potentially different data for the same address identifier A, B, C, or D.

In this example, CPU1 requests content starting at address B but data for address A is stored in the cache associated with address D. Content associated with address A is copied from the cache to the memory pool at address M and the tags for addresses A and B are swapped so that the tag of B (10) is used to identify one of three locations to store content associated with address A from the cache in the memory pool. The tag of A is updated to 00 indicate that the data associated with address A is in the cache. Note that in this example, tags for locations C and D are respectively 11 and 01 to indicate storage of content for different locations in the memory pool.

In this example, to swap content associated with addresses A and B, CPU1 provides a request to read address M with a tag of 10 (former location tag for address B) to read content of address B from the memory pool to differentiate that location 10 is to be used to read content from the memory pool. CPU1 next provides a request to write content to address M with tag of 10 to the memory pool with content from the cache associated with address A. Contents of address B are provided to the cache for CPU1 associated with address D. A pool controller can use address translation to determine a physical address to use in memory pool to access contents of address M with tag of 10 from CPU1. Here the use of data and data' are to different potentially different data for the same address identifier A, B, C, or D.

Various embodiments provide a manner of mitigating compute down time if any memory pool becomes unresponsive (e.g., loses power, malfunctions, loses connectivity) to reduce affected compute elements and virtual execution environments. For example, if 100 CPUs share a memory pool and if a memory DIMM becomes unresponsive, then 100 CPUs cannot access data and the CPUs are idle. Redundancy can allow the CPUs to access another memory pool.

Figure 23:
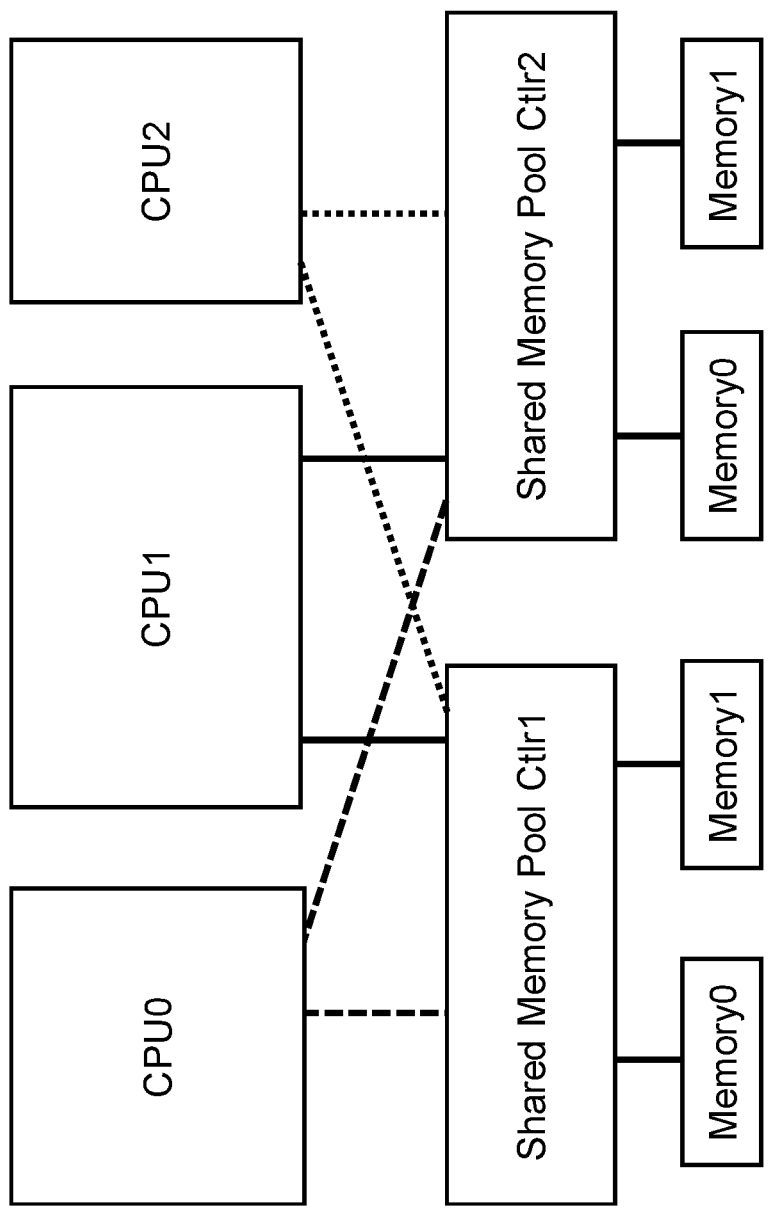
FIG. 23 depicts an example environment for mirroring write operations across two or more memory pools.

FIG. 23 depicts an example environment for mirroring write operations across two or more memory pools. In this example, CPU0, CPU1, and CPU2 has a read/write connection with two memory pools using shared memory pool controllers (Ctrl1 and Ctrl2). In some examples, some or all of the memory pools used by a CPU are configured to use the same address translation scheme so that a memory transaction that specifies an address and location tag results in the same physical address. In other words, some or all of the memory pools used by a CPU store content having a particular address and location tag in the same physical locations in all of the memory pools.

A CPU write request can be sent to two pools with one copy being a mirrored copy. A CPU read request can go to either memory pool. In some examples, to improve performance, a read operation can be split between pools such that a read transaction can be split across multiple memory pools to allow parallel read operations to increase read speed.

When a pool has an uncorrectable error (e.g., uncorrectable error correction coding (ECC)/cyclic redundancy check (CRC)), a CPU can default to sending reads/writes only to the working memory pool. When one memory pool has an uncorrectable error, data can be re-written from a second pool to the pool with the uncorrectable error potentially to a different physical address to attempt to fix the uncorrectable error.

An orchestrator system, an example of which is described earlier can configure two or more memory pools to be used by one or more CPUs. In addition, the orchestrator can perform mirroring of content among memory pools as well as resynchronization of content among the memory pools to achieve duplicate copies among the memory pools. Address translation schemes among mirror memory pools can be the same. Mirroring of more than 2 memory pools can be applied.

Figure 24:
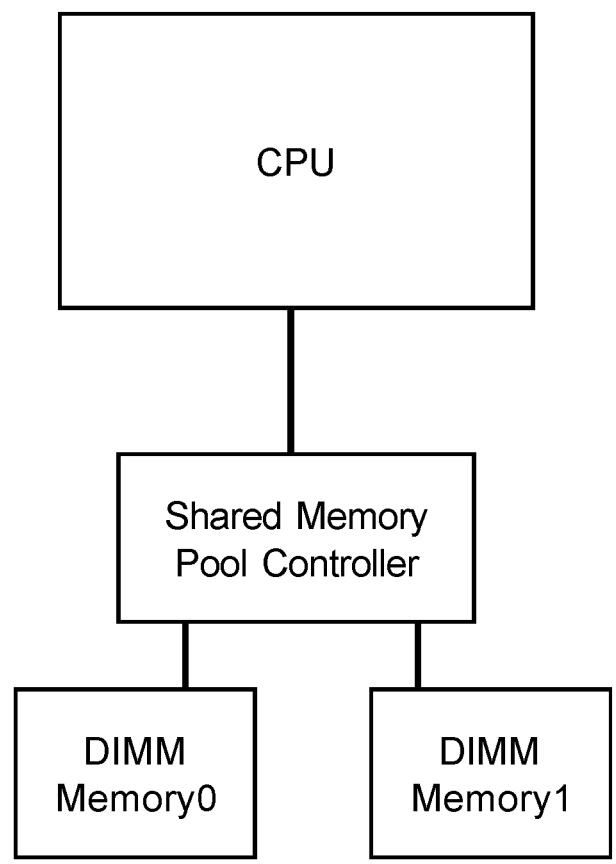
FIG. 24 depicts an example of content mirroring.

FIG. 24 depicts an example of content mirroring. In this example, a CPU is connected to a single shared memory pool controller and the shared memory pool controller manages duplication of content among multiple memory DIMM devices. In this example, where memory DIMMs 0 and 1 store duplicate content, a memory pool is populated with twice an amount of memory and two times as many memory ports. Shared memory pool controller can duplicate writes across two memory ports, where one port is the main port and the other port is the mirror port. Mirroring of more than 2 memory pools can be applied.

Read operations can be alternated between the mirrored pair of memory DIMMs. In response to an uncorrectable error, the data can be read from the alternate port. Re-write of the uncorrectable data can be performed using data from the mirrored port to another memory DIMM.

Figure 25:
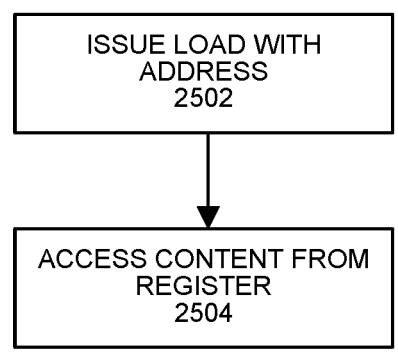
FIG. 25 depicts an example process.

FIG. 25 depicts an example process. The process can be performed by a CPU to request content associated with an address. At 2502, a load request is issued with an associated address. The CPU can also specify a CPU identifier to differentiate the CPU from other CPUs. The request can be received by a memory controller. At 2504, the CPU accesses content from a register associated with the load request or a cache or near memory. For example, the content can be provided from a cache or local memory to the CPU or from a memory pool shared by the CPU with other CPUs. The memory allocated to the CPU can be thinly provisioned whereby the CPU is allocated an amount of memory to use but the physical address ranges actually allocated to the CPU is less than the allocated amount.

Figure 26:
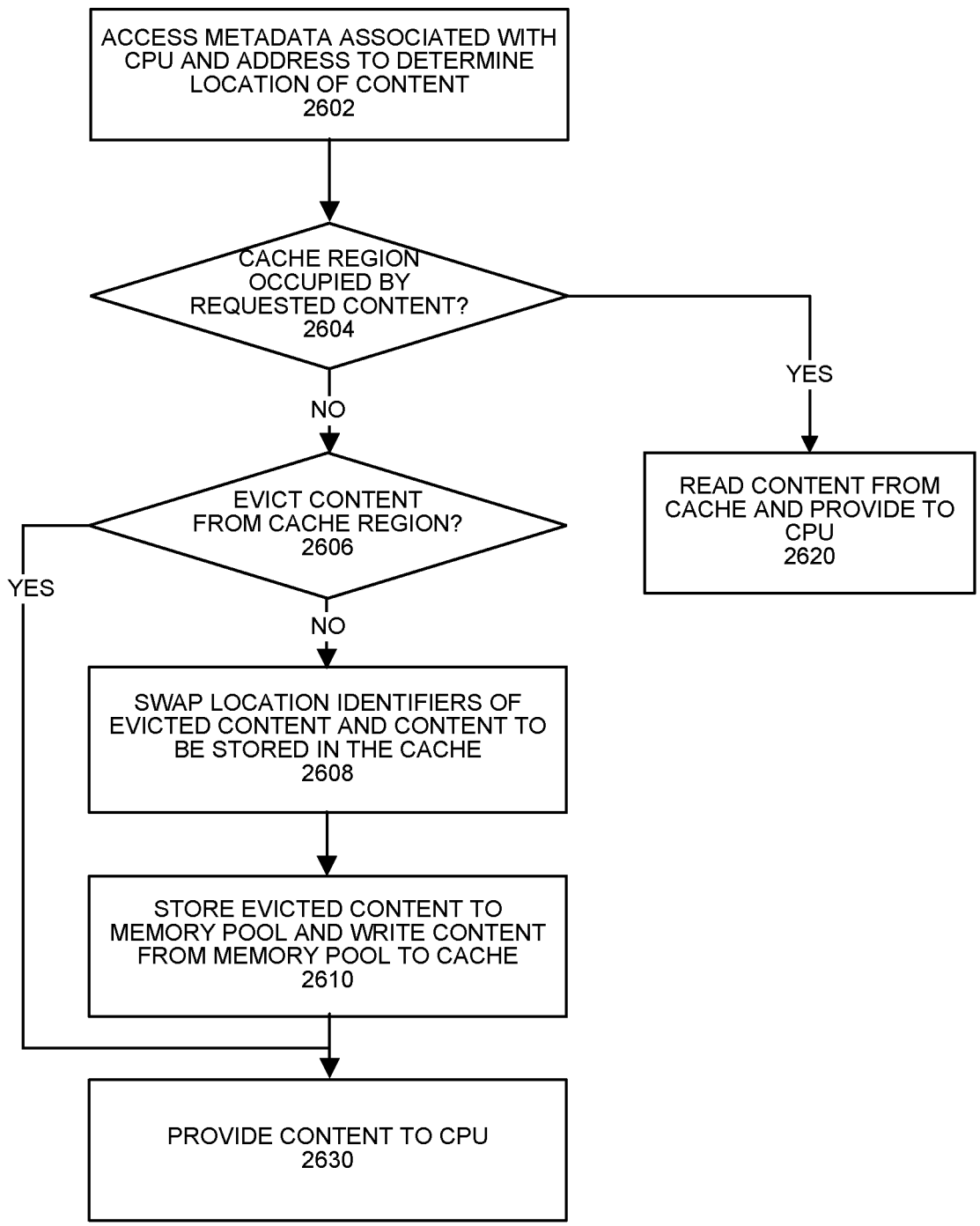
FIG. 26 depicts an example process.

FIG. 26 depicts an example process. The process can be performed in response to a request to access content of a cache or memory and be performed by one or more of a memory controller, processor, interface to a connection, or pool controller. At 2602, a metadata entry associated with a memory access request from a CPU can be accessed to determine a location of content referenced by the memory access request. The metadata entry can be associated with a particular CPU and address. The metadata entry can be stored in memory or storage. When the application or software executed by the CPU receives a thin memory provision, the location can identify whether content is stored in the cache or in one or one of multiple regions in a memory pool. At 2604, a determination is made if a cache region associated with the location referenced by the memory request stores content associated with the location referenced by the memory request. If the cache region associated with the location referenced by the memory request stores content associated with the location referenced by the memory request, then 2620 follows where content is read from the cache and provided to the CPU. For example, the content can be copied to the CPU's register for access by the software executed by the CPU or accessed from the cache or near memory.

If the cache region associated with the location referenced by the memory request does not store content associated with the location referenced by the memory request, then 2606 follows. At 2606, a determination is made as to whether to evict content from the cache region associated with the location referenced by the memory request. For example, a metadata entry associated with the location referenced by the memory request can indicate access level of content stored at the location. If the content in the cache region is accessed more frequently than the requested content and the requested content is stored in the memory pool, then 2630 can follow, where the requested content from the memory pool can be provided to the requester CPU (e.g., to a CPU register) without evicting content from the cache region.

If the content in the cache region is accessed less frequently than the requested content and the requested content is stored in the memory pool, then 2608 can follow. At 2608, location identifiers for the content in the cache region (evicted content) and the requested content in the memory pool are swapped. At 2610, the requested content from the memory pool can be stored in the cache region and content in the cache region stored in a possible location in the memory pool. For example, to write evicted content to the memory pool, a CPU provides a CPU identifier, an address of a region to write into the memory pool and a location identifier. The memory pool controller translates the memory request from the CPU to a physical address based on the specified CPU, address of a region, and location identifier. In a thinly provisioned memory pool, X addresses can be allocated to use less-than-X addresses in the combination of the cache and the memory pool. The location identifier can help to identify which address in the memory pool or cache is being used for a particular address. The process continues to 2630, described earlier.

Figure 27:
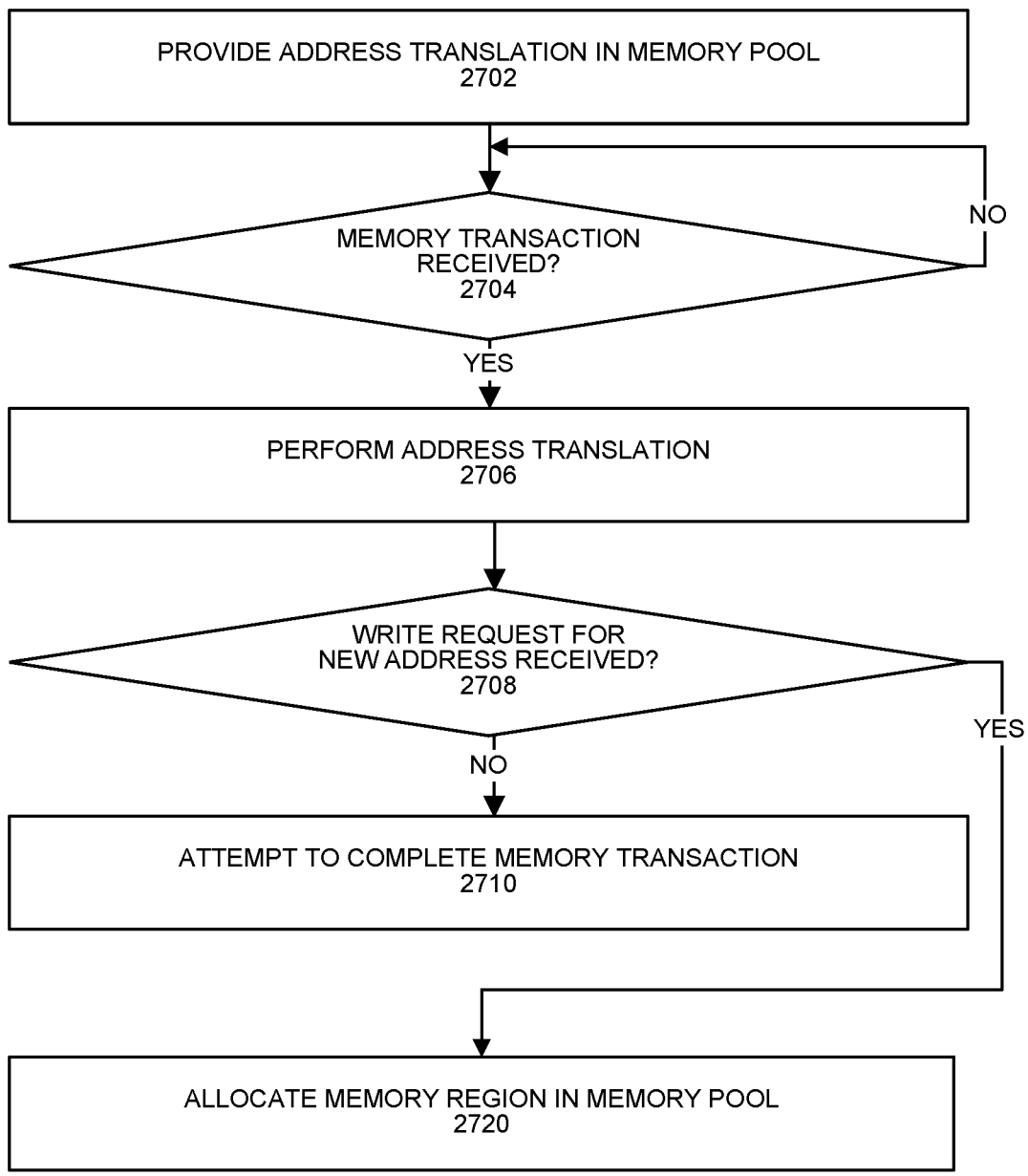
FIG. 27 depicts a process.

FIG. 27 depicts a process. The process can be performed by a memory pool controller to provision address space translation for memory DIMMs in one or more memory servers. At 2702, address translations in a memory pool are provisioned. For example, addresses associated with a particular CPU and location identifier can be provisioned in a look-up-table accessible to a memory pool controller. At 2704, a determination is made as to whether a memory transaction is received. If a memory transaction is not received, 2704 repeats.

If a memory transaction is received, the process continues to 2706, where an address space translation takes place. For example, an address provided by a particular CPU and location identifier can be used to identify a physical address in the memory pool. At 2708, a determination is made if the memory transaction is a write request for a new translated address. For example, if the address has not been written to, at 2720, the pool controller can provision the memory to provide space in the memory associated with the address. In other words, the requester CPU or executed software can be allocated the address but the actual physical address allocation does not take place until a write operation to the physical address (after address translation) is made.

If at 2708, a determination is made that the memory transaction is not a write request for a new translated address, then the process continues to 2710. For example, a memory transaction that is not a write request for a new translated address can be a write operation or read operation to a previously written-to translated physical address.

At 2710, the memory transaction is performed. If the memory transaction is a read operation, content associated with the translated address is provided to the requester CPU. If the memory transaction is a write operation, content associated with the translated address is written to the memory pool.

Figure 28:
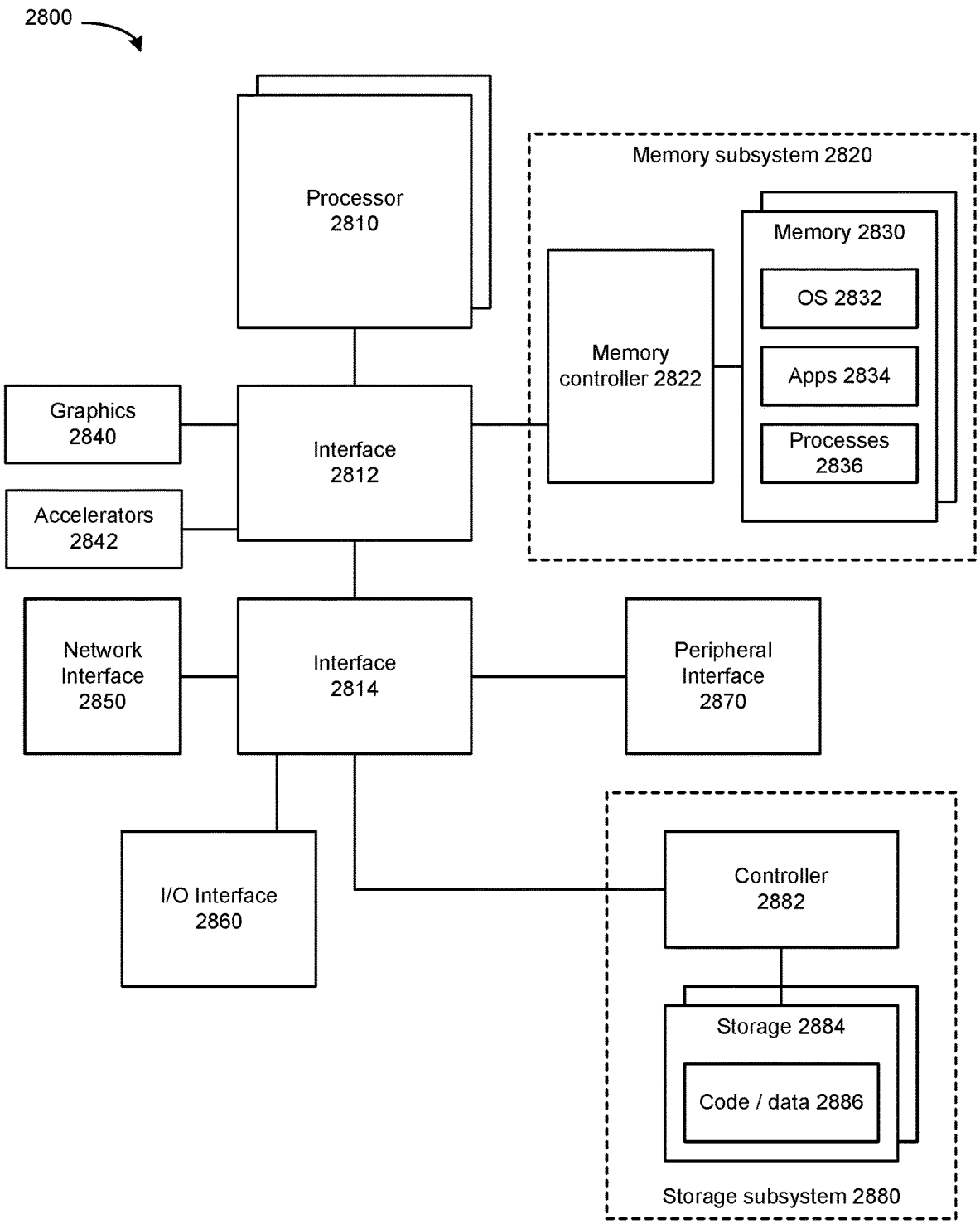
FIG. 28 depicts a system.

FIG. 28 depicts a system. The system can use embodiments described herein at least to use technologies described herein to access cache, memory, and memory pool subject to thin memory provisioning. System 2800 includes processor 2810, which provides processing, operation management, and execution of instructions for system 2800. Processor 2810 can include any type of microprocessor, central processing unit (CPU), graphics processing unit (GPU), processing core, or other processing hardware to provide processing for system 2800, or a combination of processors. Processor 2810 controls the overall operation of system 2800, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 2800 includes interface 2812 coupled to processor 2810, which can represent a higher speed interface or a high throughput interface for system components that needs higher bandwidth connections, such as memory subsystem 2820 or graphics interface components 2840, or accelerators 2842. Interface 2812 represents an interface circuit, which can be a standalone component or integrated onto a processor die. Where present, graphics interface 2840 interfaces to graphics components for providing a visual display to a user of system 2800. In one example, graphics interface 2840 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 2840 generates a display based on data stored in memory 2830 or based on operations executed by processor 2810 or both. In one example, graphics interface 2840 generates a display based on data stored in memory 2830 or based on operations executed by processor 2810 or both.

Accelerators 2842 can be a fixed function offload engine that can be accessed or used by a processor 2810. For example, an accelerator among accelerators 2842 can provide compression (DC) capability, cryptography services such as public key encryption (PKE), cipher, hash/authentication capabilities, decryption, or other capabilities or services. In some embodiments, in addition or alternatively, an accelerator among accelerators 2842 provides field select controller capabilities as described herein. In some cases, accelerators 2842 can be integrated into a CPU socket (e.g., a connector to a motherboard or circuit board that includes a CPU and provides an electrical interface with the CPU). For example, accelerators 2842 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 2842 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 2820 represents the main memory of system 2800 and provides storage for code to be executed by processor 2810, or data values to be used in executing a routine. Memory subsystem 2820 can include one or more memory devices 2830 such as read-only memory (ROM), flash memory, one or more varieties of random access memory (RAM) such as DRAM, or other memory devices, or a combination of such devices. Memory 2830 stores and hosts, among other things, operating system (OS) 2832 to provide a software platform for execution of instructions in system 2800. Additionally, applications 2834 can execute on the software platform of OS 2832 from memory 2830. Applications 2834 and OS 2832 can be executed within a virtual machine environment or container environment with distinct allocated memory regions. Applications 2834 represent programs that have their own operational logic to perform execution of one or more functions. Processes 2836 represent agents or routines that provide auxiliary functions to OS 2832 or one or more applications 2834 or a combination. OS 2832, applications 2834, and processes 2836 provide software logic to provide functions for system 2800. In one example, memory subsystem 2820 includes memory controller 2822, which is a memory controller to generate and issue commands to memory 2830. It will be understood that memory controller 2822 could be a physical part of processor 2810 or a physical part of interface 2812. For example, memory controller 2822 can be an integrated memory controller, integrated onto a circuit with processor 2810.

While not specifically illustrated, it will be understood that system 2800 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 2800 includes interface 2814, which can be coupled to interface 2812. In one example, interface 2814 represents an interface circuit, which can include standalone components and integrated circuitry. In one example, multiple user interface components or peripheral components, or both, couple to interface 2814. Network interface 2850 provides system 2800 the ability to communicate with remote devices (e.g., servers or other computing devices) over one or more networks. Network interface 2850 can include an Ethernet adapter, wireless interconnection components, cellular network interconnection components, USB (universal serial bus), or other wired or wireless standards-based or proprietary interfaces. Network interface 2850 can transmit data to a device that is in the same data center or rack or a remote device, which can include sending data stored in memory. Network interface 2850 can receive data from a remote device, which can include storing received data into memory. Various embodiments can be used in connection with network interface 2850, processor 2810, and memory subsystem 2820.

In one example, system 2800 includes one or more input/output (I/O) interface(s) 2860. I/O interface 2860 can include one or more interface components through which a user interacts with system 2800 (e.g., audio, alphanumeric, tactile/touch, or other interfacing). Peripheral interface 2870 can include any hardware interface not specifically mentioned above. Peripherals refer generally to devices that connect dependently to system 2800. A dependent connection is one where system 2800 provides the software platform or hardware platform or both on which operation executes, and with which a user interacts.

In one example, system 2800 includes storage subsystem 2880 to store data in a nonvolatile manner. In one example, in certain system implementations, at least certain components of storage 2880 can overlap with components of memory subsystem 2820. Storage subsystem 2880 includes storage device(s) 2884, which can be or include any conventional medium for storing large amounts of data in a nonvolatile manner, such as one or more magnetic, solid state, or optical based disks, or a combination. Storage 2884 holds code or instructions and data 2886 in a persistent state (e.g., the value is retained despite interruption of power to system 2800). Storage 2884 can be generically considered to be a "memory," although memory 2830 is typically the executing or operating memory to provide instructions to processor 2810. Whereas storage 2884 is nonvolatile, memory 2830 can include volatile memory (e.g., the value or state of the data is indeterminate if power is interrupted to system 2800). In one example, storage subsystem 2880 includes controller 2882 to interface with storage 2884. In one example controller 2882 is a physical part of interface 2814 or processor 2810 or can include circuits or logic in both processor 2810 and interface 2814.

A volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 2800. More specifically, power source typically interfaces to one or multiple power supplies in system 2800 to provide power to the components of system 2800. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 2800 can be implemented using interconnected compute sleds of processors, memories, storages, network interfaces, and other components. High speed interconnects can be used such as PCIe, Ethernet, or optical interconnects (or a combination thereof).

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, a blade includes components common to conventional servers, including a main printed circuit board (main board) providing internal wiring (e.g., buses) for coupling appropriate integrated circuits (ICs) and other components mounted to the board.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof.

Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," "logic," "circuit," or "circuitry." A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Example 1 includes an apparatus that includes an interface to a memory; an interface to a memory pool; and a memory controller coupled to the interface to the memory and to an interface to the memory pool, the memory controller to: receive a memory transaction request from a processor, the memory transaction request comprising a first address and access metadata associated with the first address to determine whether content associated with the memory transaction request is stored in the memory or the memory pool, wherein a memory allocation to the processor is thinly provisioned so that less physical addressable memory is allocated among the memory and the memory pool than the processor's memory allocation configuration.

Example 2 includes any example, wherein multiple addresses share use of an addressable region in the memory and the memory pool.

Example 3 includes any example, wherein the metadata comprises a location indicator and the location indicator is to identify whether content associated with the first address is stored in the memory or the memory pool.

Example 4 includes any example, wherein: the metadata comprises an accesses indicator to identify a number of accesses associated with the first address over an amount of time.

Example 5 includes any example, and includes second metadata for a second address, wherein: the second metadata comprises a location indicator to indicate whether content associated with the second address is stored in the memory or the memory pool and the second metadata comprises an accesses indicator to identify a number of accesses associated with the second address over an amount of time.

Example 6 includes any example, wherein the memory controller is based on the location indicator of the second metadata indicating that content associated with the second address is stored in the memory, the memory controller is to determine whether to evict content associated with the second address based on the access indicator associated with the first address and the access indicator associated with the second address.

Example 7 includes any example, wherein in response to a determination to evict content associated with a second address from the memory, the memory controller is to cause storage of content associated with the second address into the memory pool and update a location indicator of the second metadata to identify a location of content of the second address as being in the memory pool.

Example 8 includes any example, wherein: content associated with the first address is stored in the memory or in the memory pool but not both.

Example 9 includes any example, wherein: content associated with the first address is stored in the memory and in the memory pool.

Example 10 includes any example, and includes multiple memory pools coupled to the memory controller, wherein the memory pools provide redundant storage of content associated with the first address.

Example 11 includes any example, wherein: based on the memory transaction request for the first address being associated with content stored in the memory pool, the memory controller is to cause transmission of a memory pool access request with requesting processor identifier, location identifier, and the first address.

Example 12 includes any example, wherein: multiple processors are allocated access to a same first address value and wherein a physical address in the memory pool is based on an address translation based on the processor identifier, location identifier, and the first address.

Example 13 includes any example, wherein: a physical memory region is allocated in the memory pool in response to a write operation to the memory pool.

Example 14 includes any example, wherein the memory comprises one or more of: a cache and a volatile memory device.

Example 15 includes any example, wherein a strict subset of the memory is allocated for thin memory provisioning.

Example 16 includes any example, and includes the memory pool and a second processor, wherein the processor and the second processor are coupled to the memory pool.

Example 17 includes any example, and includes the memory and the memory pool, wherein the memory controller, memory, and memory pool are part of one or more of: a data center, rack, blade, or computing platform.

Example 18 includes a non-transitory computer-readable medium, comprising instructions stored thereon, that if executed by one or more processors, cause the one or more processors to: in a thinly provisioned allocation in a memory and memory pool, identify an address associated with a memory transaction based on metadata; based on the metadata indicating that content associated with the address is stored in the memory, access a second address in the memory in response to the memory transaction; and based on the metadata indicating that content associated with the address is stored in the memory, provide the metadata, address, and identifier of a processor that issued the memory transaction to the memory pool for translation into a third address in the memory pool.

Example 19 includes any example, wherein multiple addresses share use of an addressable region in the memory and the memory pool.

Example 20 includes any example, wherein the metadata comprises a location indicator and the location indicator is to identify whether content associated with the address is stored in the memory or the memory pool.

Example 21 includes any example, wherein content associated with the address is stored in the memory or in the memory pool but not both.

Example 22 includes any example, wherein content associated with the address is stored both in the memory and in the memory pool.

What is claimed is:

1. An apparatus comprising:
an interface to a memory pool; and
at least one controller coupled to the interface to the memory pool, wherein memory allocations to two or more processors exceeds physical addressable memory allocated in the memory pool to the two or more processors, wherein multiple tenants share use of the memory pool, and wherein the at least one controller is to:
  receive a first memory transaction request, the first memory transaction request comprising a first address and a first processor identifier and the first memory transaction request is received based on requested data associated with the first memory transaction request not stored in a near memory device coupled to at least one processor of the two or more processors;
  translate the first address to a first physical address in the memory pool based on the first processor identifier;
  receive a second memory transaction request, the second memory transaction request comprising the first address and a second processor identifier;
  translate the first address to a second physical address in the memory pool based on the second processor identifier, wherein the first physical address is different than the second physical address and the first processor identifier is different than the second processor identifier; and
  allocate a physical memory region in the memory pool in response to a write operation to the memory pool and wherein:
    receipt of the first memory transaction request and the second memory transaction request is based on metadata accessed by a sender,
    the metadata comprises a location indicator and the location indicator is to identify whether content associated with the first address is stored in the near memory device or the memory pool,
    the metadata comprises a first access indicator to identify a number of accesses associated with the first address over an amount of time,
    the sender is to access second metadata for a second address, the second metadata comprises a location indicator to indicate whether content associated with the second address is stored in the near memory device or the memory pool, the second metadata comprises a second access indicator to identify a number of accesses associated with the second address over an amount of time, in response to a determination to evict content associated with a second address from the near memory device, the sender is to cause storage of content associated with the second address into the memory pool and update a location indicator of the second metadata to identify a location of content of the second address as being in the memory pool, and based on the location indicator of the second metadata indicating that content associated with the second address is stored in the near memory device, the sender is to determine whether to evict content associated with the second address based on the first access indicator associated with the first address and the second access indicator associated with the second address.

2. The apparatus of claim 1, further comprising multiple memory pools coupled to the at least one controller, wherein the memory pools provide redundant storage of content associated with the first address.

3. The apparatus of claim 1, wherein the near memory device comprises one or more of: a cache and a volatile memory device.

4. The apparatus of claim 3, wherein a strict subset of the near memory device is allocated for thin memory provisioning.

5. The apparatus of claim 1, further comprising the memory pool.

6. The apparatus of claim 1, further comprising the near memory device and the memory pool, wherein the at least one controller, the near memory device, and the memory pool are part of one or more of: a data center, rack, blade, or computing platform.

7. The apparatus of claim 1, wherein in response to eviction of content associated with the second address from the near memory device, the sender is to cause storage of content into an available addressable region in the near memory device.

8. The apparatus of claim 1, wherein:
a memory address value is allocated to multiple processors,
in a first mode, content associated with the memory address value is stored in both a memory and the memory pool, and
in a second mode, content associated with the memory address value is stored in the memory or in the memory pool but not both.

9. The apparatus of claim 1, wherein at least one the two or more processors is to execute an operating system (OS) and the OS is to request utilization of memory within the physical addressable memory allocated in the memory pool and wherein the physical address memory allocated to the OS is less than the memory allocations to the two or more processors.

10. The apparatus of claim 1, wherein the near memory device is communicatively coupled to the at least one processor of the two or more processors by a device interface and wherein the memory pool is coupled to the at least one controller by a network interface device.

11. The apparatus of claim 1, wherein the memory pool consists of volatile memory.

12. At least one non-transitory computer readable medium, comprising instructions stored thereon, that if executed by one or more processors, cause the one or more processors to:

allocate less physical addressable memory in a near memory device and a memory pool to two or more processors than is allocated to the two or more processors, and configure a controller to:
receive a first memory transaction request from at least one processor, the first memory transaction request comprising a first address and a first processor identifier and the first memory transaction request was received based on requested data associated with the first memory transaction request not being stored in the near memory device;

translate the first address to a first physical address in the memory pool based on the first processor identifier;

receive a second memory transaction request, the second memory transaction request comprising the first address and a second processor identifier;

translate the first address to a second physical address in the memory pool based on the second processor identifier, wherein the first physical address is different than the second physical address and the first processor identifier is different than the second processor identifier; and allocate a physical memory region in the memory pool in response to a write operation to the memory pool, wherein:
receipt of the first memory transaction request and the second memory transaction request is based on metadata accessed by a sender, the metadata comprises a location indicator and the location indicator is to identify whether content associated with the first address is stored in the near memory device or the memory pool, the metadata comprises a first access indicator to identify a number of accesses associated with the first address over an amount of time, the sender is to access second metadata for a second address, the second metadata comprises a location indicator to indicate whether content associated with the second address is stored in the near memory device or the memory pool, the second metadata comprises a second accesses indicator to identify a number of accesses associated with the second address over an amount of time, in response to a determination to evict content associated with a second address from the near memory device, the sender is to cause storage of content associated with the second address into the memory pool and update a location indicator of the second metadata to identify a location of content of the second address as being in the memory pool, and based on the location indicator of the second metadata indicating that content associated with the second address is stored in the near memory device, the sender is to determine whether to evict content associated with the second address based on the first access indicator associated with the first address and the second access indicator associated with the second address.

13. The computer readable medium of claim 12, wherein:
a memory address value is allocated to multiple processors,
in a first mode, content associated with the memory address value is stored in both the near memory device and the memory pool, and
in a second mode, content associated with the memory address value is stored in the near memory device or in the memory pool but not both.

14. The computer readable medium of claim 12, wherein:
based on data associated with a first address value of multiple different address values that is stored in the near memory device being accessed less than data associated with a second address value of the multiple different address values that is stored in the memory pool, the controller is to cause a copy of data associated with the second address value from the memory pool into the near memory device and cause an update to the metadata to identify that the second address value is associated with the near memory device.

15. The computer readable medium of claim 12, comprising instructions stored thereon, that if executed by one or more processors, cause the one or more processors to:
configure the controller to:
allocate a physical address in the near memory device or the memory pool to a memory address at or after a write operation of data to the memory address.

16. The computer readable medium of claim 12, wherein the near memory device is communicatively coupled to a host system by a device interface and wherein the memory pool is coupled to the controller by a network interface device.

17. The computer readable medium of claim 12, wherein the memory pool consists of volatile memory.

* * * * *